(12) United States Patent
Shinobu et al.

(10) Patent No.: US 10,316,920 B2
(45) Date of Patent: Jun. 11, 2019

(54) ANTI-VIBRATION DEVICE

(71) Applicant: TOYO TIRE & RUBBER CO., LTD., Osaka-shi, Osaka (JP)

(72) Inventors: Syunichi Shinobu, Osaka (JP); Norimitsu Furusawa, Osaka (JP)

(73) Assignee: TOYO TIRE & RUBBER CO., LTD., Osaka (JP)

( * ) Notice: Subject to any disclaimer, the term of this patent is extended or adjusted under 35 U.S.C. 154(b) by 225 days.

(21) Appl. No.: 14/368,470

(22) PCT Filed: Dec. 28, 2012

(86) PCT No.: PCT/JP2012/084191
§ 371 (c)(1),
(2) Date: Jun. 24, 2014

(87) PCT Pub. No.: WO2013/140700
PCT Pub. Date: Sep. 26, 2013

(65) Prior Publication Data
US 2015/0014906 A1    Jan. 15, 2015

(30) Foreign Application Priority Data

Mar. 20, 2012 (JP) ................................. 2012-062955
Jun. 26, 2012 (JP) ................................. 2012-143573

(51) Int. Cl.
*F16F 1/38* (2006.01)
*F16F 15/08* (2006.01)

(52) U.S. Cl.
CPC .............. *F16F 1/38* (2013.01); *F16F 1/3807* (2013.01); *F16F 1/3828* (2013.01); *F16F 1/3863* (2013.01); *F16F 15/08* (2013.01)

(58) Field of Classification Search
CPC .......... F16F 1/38; F16F 1/3828; F16F 1/3807; F16F 1/3863
(Continued)

(56) References Cited

U.S. PATENT DOCUMENTS 3,781,073 A * 12/1973 Jorn ........................ F16C 11/04
384/220
4,936,556 A * 6/1990 Makibayashi .......... F16F 13/16
267/140.13
(Continued)

FOREIGN PATENT DOCUMENTS

JP   02-229929 A   9/1990
JP   04-185924 A   7/1992
(Continued)

OTHER PUBLICATIONS

Office Action dated Mar. 24, 2015, issued in corresponding Chinese application No. 201280060907.6 (with English Translation). (23 pages).
(Continued)

*Primary Examiner* — Xuan Lan Nguyen
(74) *Attorney, Agent, or Firm* — Westerman, Hattori, Daniels & Adrian, LLP

(57) ABSTRACT

A vibration damper, which enables a spring constant in the axial direction to be increased while reducing a spring constant in the torsional direction and a spring constant in the direction perpendicular to the axial direction, is provided. With dividing surfaces of first rubber parts and dividing surfaces of second rubber parts separated from each other in the direction of the axis, and spaces formed between the dividing surfaces, first outer cylinder parts and second outer cylinder parts are held and fixed by cylindrical members. Using the spaces between the dividing surfaces of the first rubber parts and the dividing surfaces of the second rubber parts, a compression component of the rubber base in the direction of the axis can be maintained while suppressing a shear component of the rubber base in the torsional direction and the compression component of the rubber base in the direction perpendicular to the axis.

5 Claims, 19 Drawing Sheets

(58) Field of Classification Search
USPC .......................................................... 267/293
See application file for complete search history.

(56) References Cited

U.S. PATENT DOCUMENTS

| | | | |
|---|---|---|---|
| 5,031,545 A | | 7/1991 | Bourgeot |
| 5,058,867 A | * | 10/1991 | Hadano ................. B60G 7/005 |
| | | | 248/635 |
| 5,967,668 A | * | 10/1999 | Germano ................. B60G 7/02 |
| | | | 267/293 |

FOREIGN PATENT DOCUMENTS

| | | | | |
|---|---|---|---|---|
| JP | 04-210134 A | | 7/1992 | |
| JP | 05-067839 A | | 9/1993 | |
| JP | 2001-82533 A | * | 3/2001 | ............. F16F 13/14 |
| JP | 4203063 B2 | | 6/2007 | |
| JP | 2008-019927 A | | 1/2008 | |
| JP | 2010-060022 A | | 3/2010 | |

OTHER PUBLICATIONS

International Search Report, dated Feb. 12, 2013, issued in corresponding application No. PCT/JP2012/084191.

\* cited by examiner

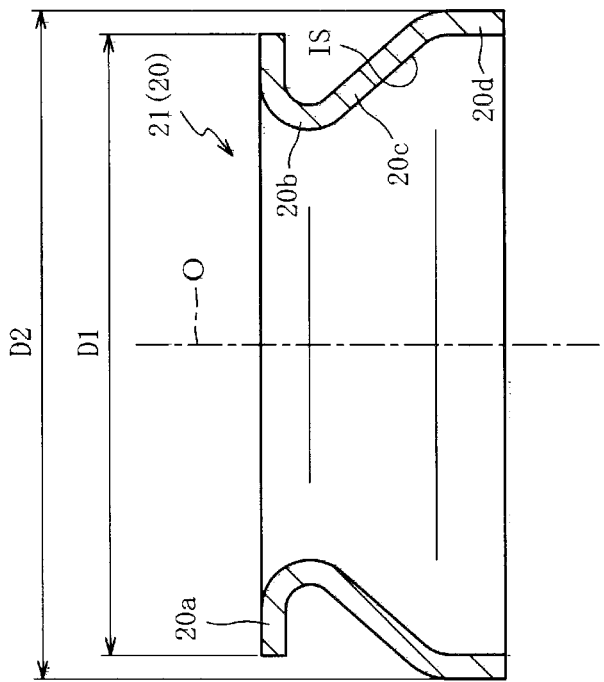
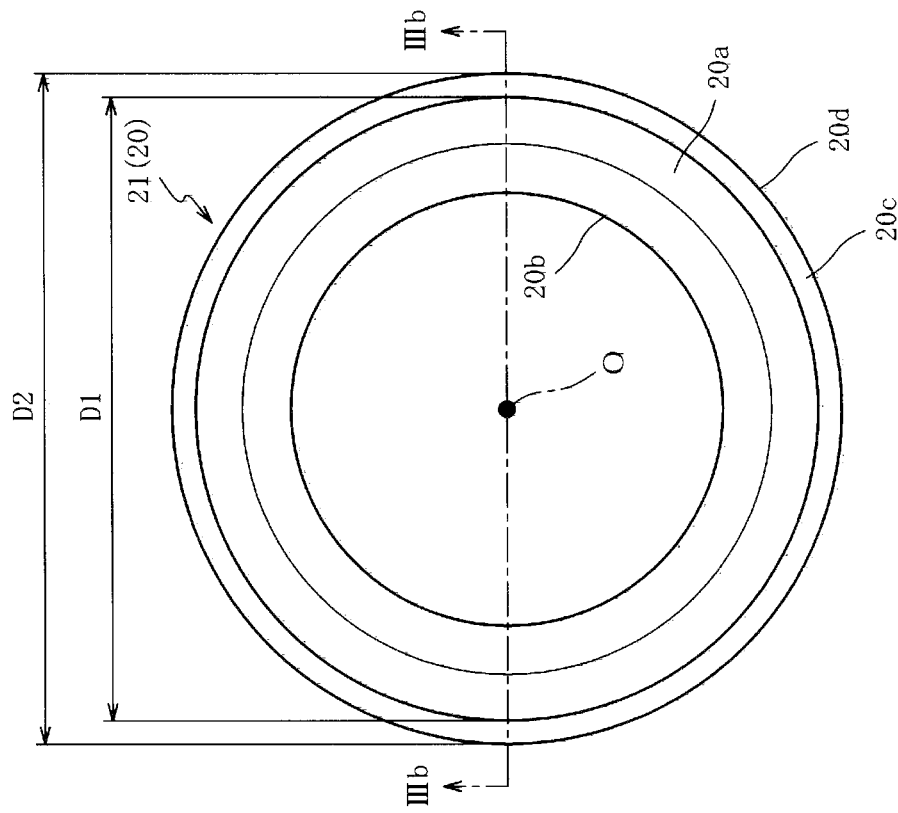
Fig. 3B
Fig. 3A

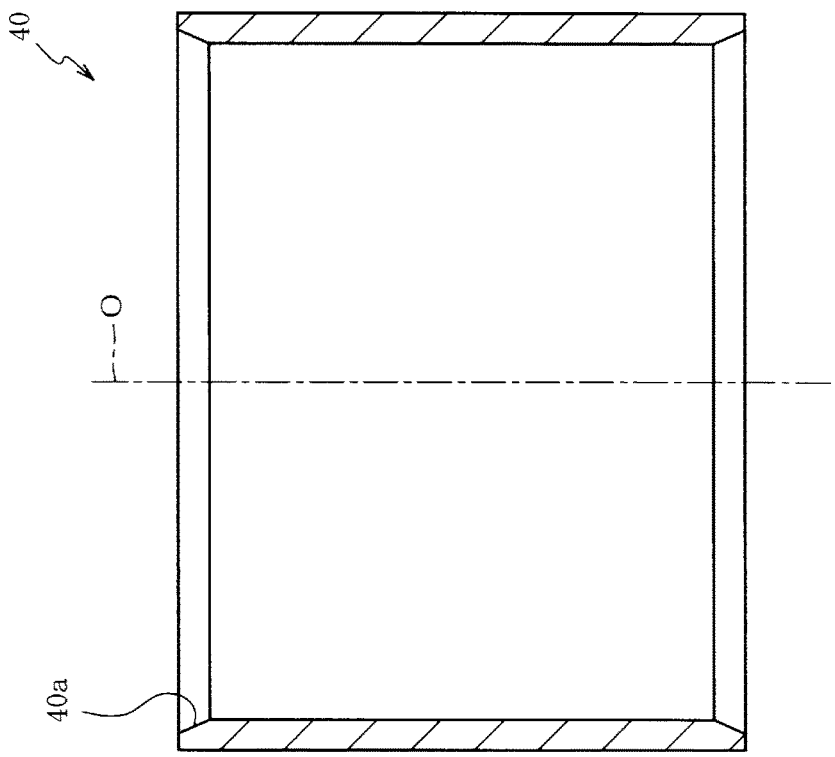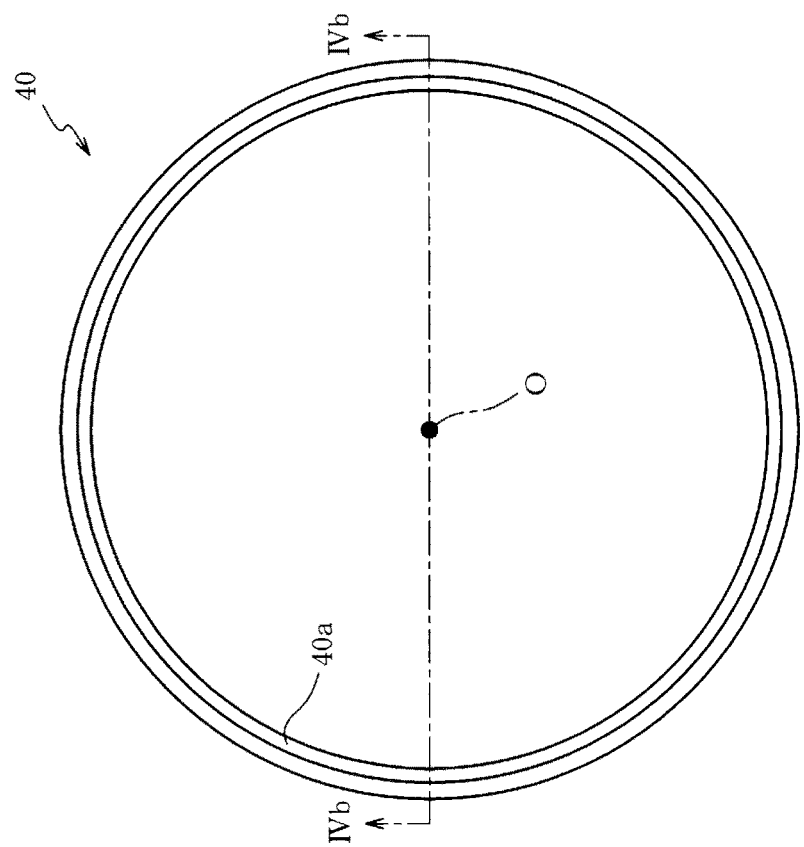

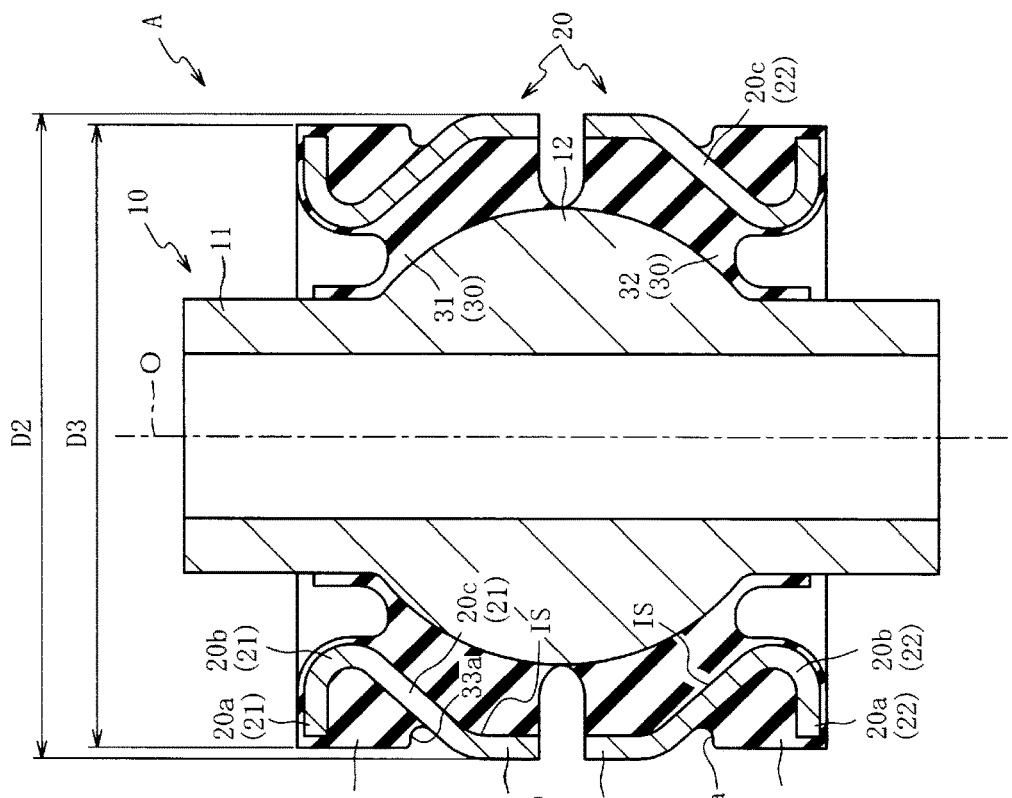
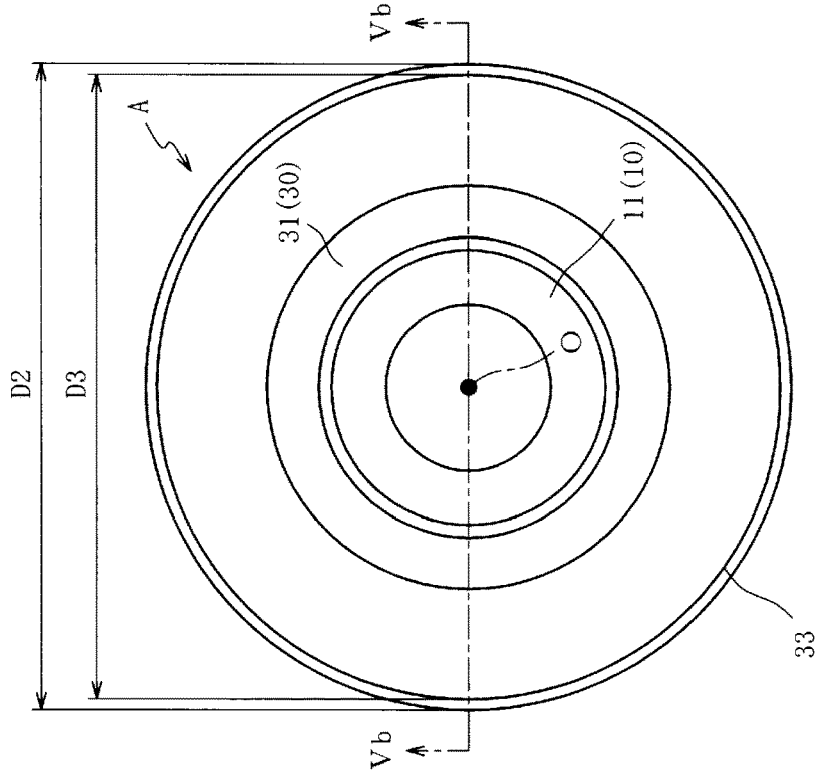
Fig. 5B
Fig. 5A

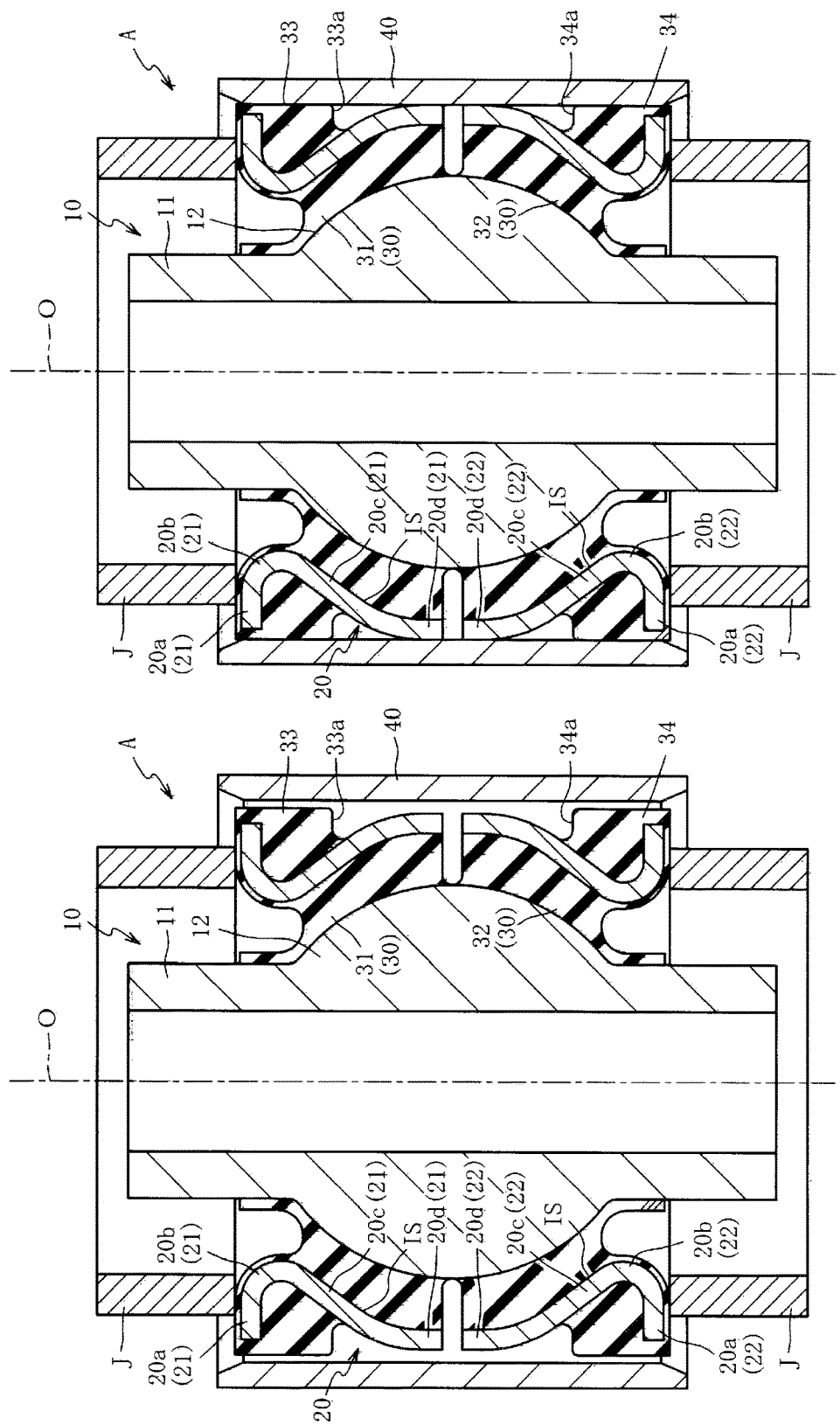

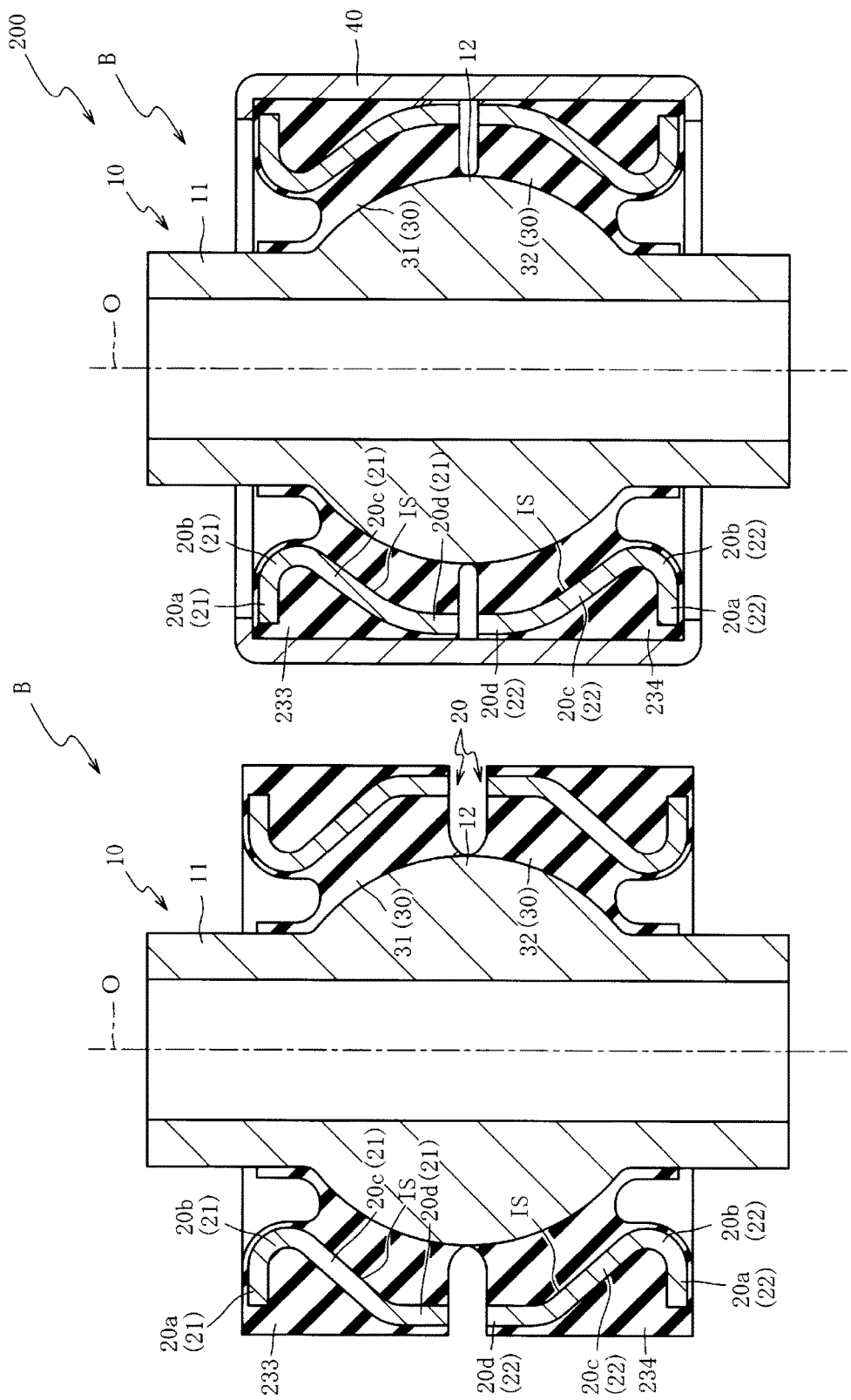

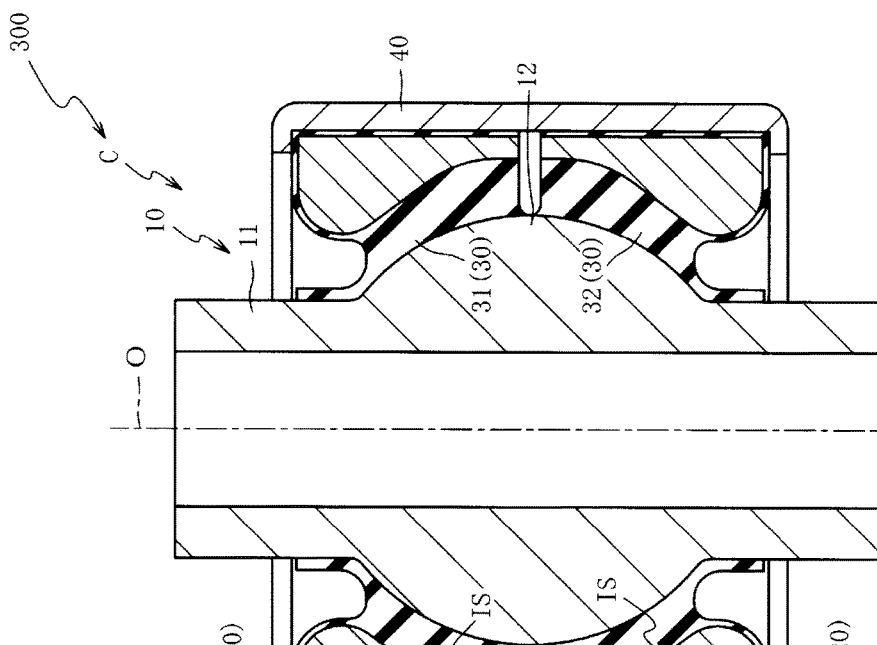
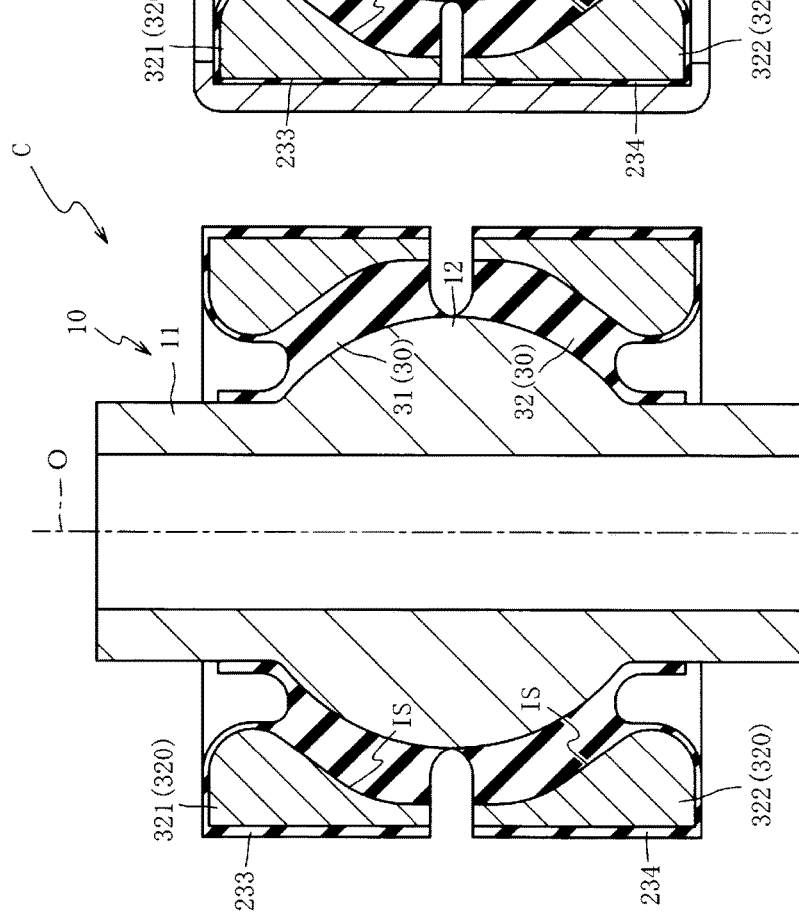
Fig. 10A
Fig. 10B

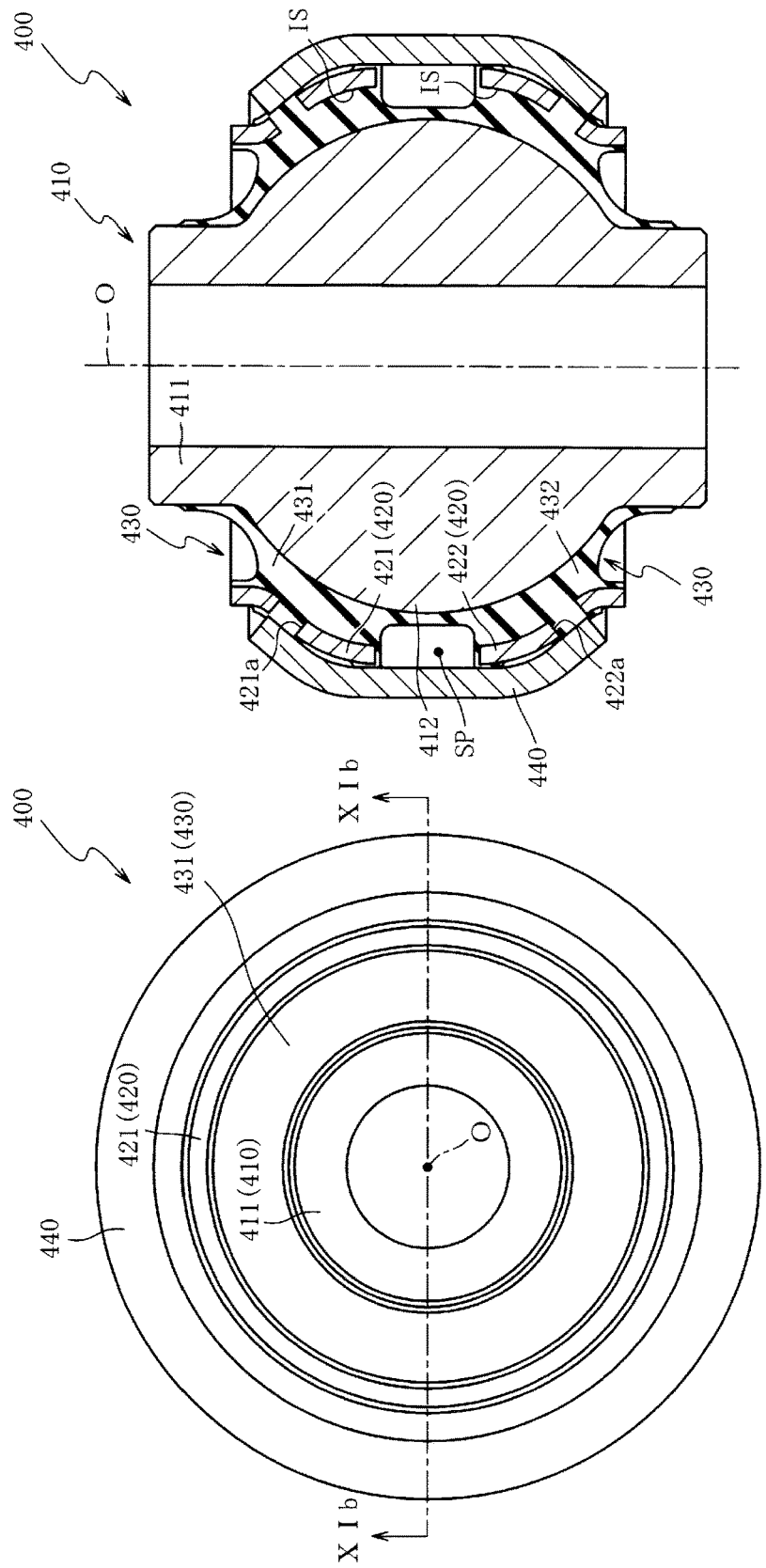

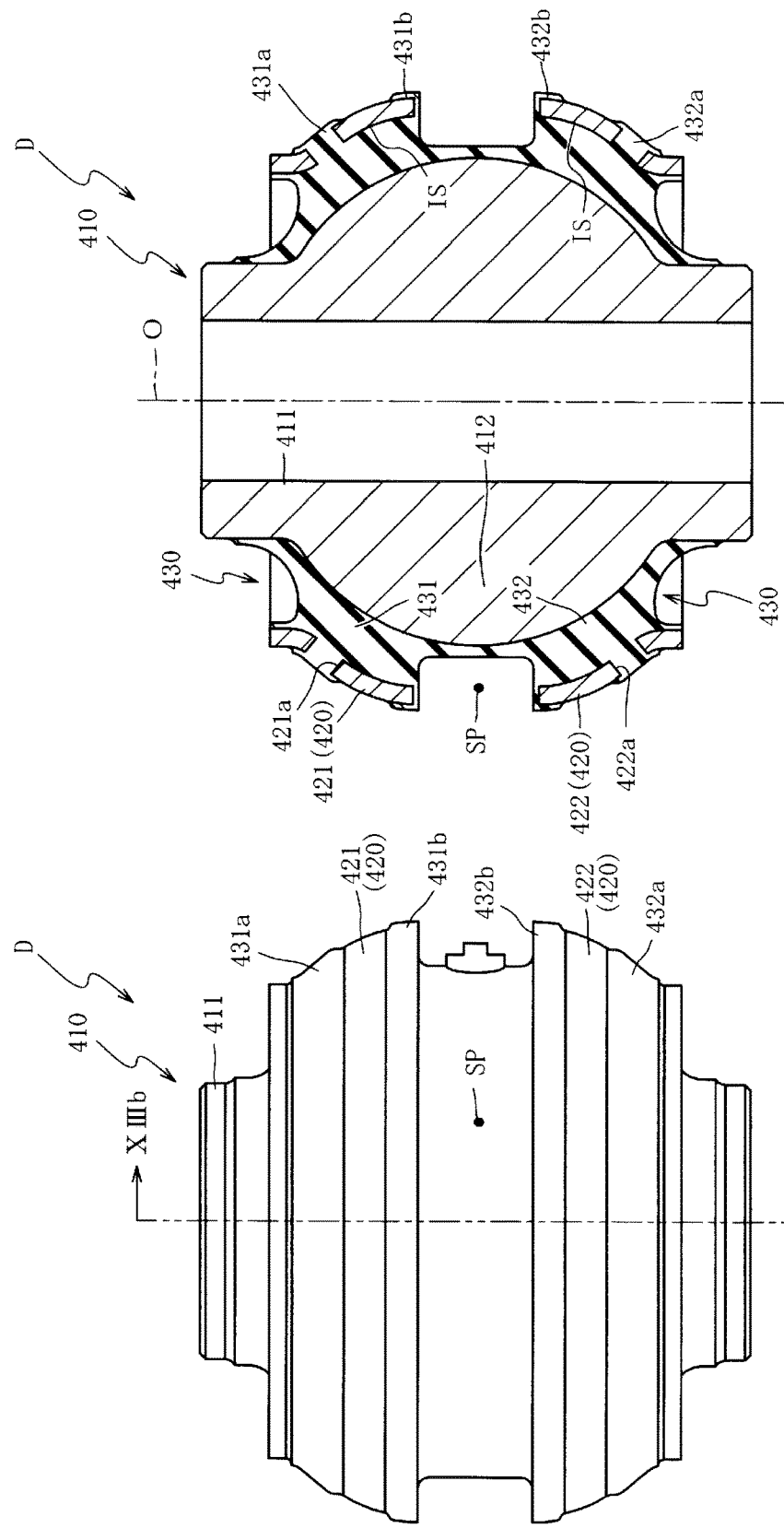

ANTI-VIBRATION DEVICE

TECHNICAL FIELD

The present invention relates to an anti-vibration device, and relates specifically to an anti-vibration device that can increase the spring constant in the axial direction while reducing the spring constant in the prying direction and the spring constant in the direction perpendicular to the axis.

BACKGROUND ART

With respect to a bush (anti-vibration device) that connects an inner tube member and an outer tube member with a rubber base body formed of a rubber-like elastic body and is used for a suspension device, it is required to reduce the spring constant in the prying direction in order to secure the riding quality of an automobile.

In Patent Literature 1, an anti-vibration bush 101 (anti-vibration device) is disclosed in which a spherical bulge section 4 bulging outward in the radial direction is arranged in the middle section in the axial direction of an inner tube 1 (inner tube member) and the inner peripheral section of an outer tube 2 (outer tube member) surrounding the bulge section 4 is formed into a spherical surface of a recessed shape that is concentric with a spherical surface of a projected shape of the bulge section 4 in order to reduce the spring constant in the prying direction.

According to this anti-vibration bush 101, the spring constant in the prying direction can be reduced, because a rubber-like elastic body 3 (rubber base body) can be deformed mainly in the shearing direction between the spherical surface of a projected shape and the spherical surface of a recessed shape that is concentric therewith with respect to an input of the displacement in the prying direction.

CITATION LIST

Patent Literature

[Patent Literature 1] Japanese Unexamined Patent Application Publication No. 2008-019927 (paragraphs 0006, 0020, FIG. 1 and the like)

SUMMARY OF INVENTION

Technical Problem

However, with respect to the conventional anti-vibration bush 101 described above, there has been a problem that it is not possible to increase the spring constant in the axial direction sufficiently while reducing the spring constant in the prying direction and the spring constant in the direction perpendicular to the axis.

The present invention has been developed in order to address the problem described above, and its object is to provide an anti-vibration device that can increase the spring constant in the axial direction while reducing the spring constant in the prying direction and the spring constant in the direction perpendicular to the axis.

Solution to Problem and Advantageous Effects of Invention

According to the anti-vibration device described in a first aspect, the rubber base body can be deformed mainly in the shearing direction with respect to an input of the displacement in the prying direction, because there are provided an inner tube member including a spherical bulge section that bulges outward in the radial direction, an outer tube member including a recessed inner peripheral surface which is a spherical surface of a recessed shape surrounding the bulge section of the inner tube member, and a rubber base body that connects the outer peripheral surface of the bulge section of the inner tube member and the recessed inner peripheral surface of the outer tube member. Therefore, there is an effect that the spring constant in the prying direction can be reduced.

In this case, according to the first aspect, it is configured that the outer tube member is split in the axial direction into a first outer tube section and a second outer tube section, the gaps between the recessed inner peripheral surface in the first outer tube section and the recessed inner peripheral surface in the second outer tube section and the outer peripheral surface of the bulge section of the inner tube member are connected to each other by a first rubber section and a second rubber section respectively, and the first outer tube section and the second outer tube section are held and fixed by a tubular member of a tubular shape disposed on the outer periphery side thereof.

Therefore, after the first rubber section and the second rubber section are vulcanizingly molded, in a state where the split surface of the first rubber section and the split surface of the second rubber section depart from each other in the axial direction and a space is formed between the split surfaces, the first outer tube section and the second outer tube section can be held and fixed by the tubular member. The compression component of the rubber base body in the axial direction can be secured while suppressing the shearing component of the rubber base body in the prying direction and the compression component of the rubber base body in the direction perpendicular to the axis corresponding to the space, because the space can be thus formed between the split surface of the first rubber section and the split surface of the second rubber section. As a result, the spring constant in the axial direction can be increased while reducing the spring constant in the prying direction and the spring constant in the direction perpendicular to the axis.

Also, with respect to the rubber base body, the first rubber section and the second rubber section do not have to be entirely split (divided) from each other in the axial direction, and only have to be split in the axial direction at least on the outer tube member side. Therefore, the first rubber section and the second rubber section may be connected to each other (may be unsplit in the axial direction) on the inner tube member side. That is, the first rubber section and the second rubber section may be connected to each other by a part of the rubber base body that covers the outer peripheral surface of the inner tube member.

According to the anti-vibration device described in a second aspect, in addition to the effects exerted by the anti-vibration device described in the first aspect, the pressure receiving area can be increased with respect to the displacement in the axial direction, and the compression component of the rubber base body can be secured because the maximum outside diameter dimension in the bulge section of the inner tube member is made larger than the minimum inside diameter dimension in an opening of the end section in the axial direction of the first outer tube section and the second outer tube section. As a result, the effect of increasing the spring constant in the axial direction while reducing the spring constant in the prying direction and the spring constant in the direction perpendicular to the axis can be made significant.

Also, such configuration of the second aspect cannot be employed in the conventional device in which the rubber base body is disposed continuously between the bulge section of the inner tube member and the recessed inner peripheral surface of the outer tube member because the shearing component of the rubber base body in the prying direction and the compression component of the rubber base body in the direction perpendicular to the axis are also increased simultaneously with the compression component of the rubber base body in the axial direction, and can be employed only after a space is formed between the split surface of the first rubber section and the split surface of the second rubber section as in the present invention. Thus, the shearing component of the rubber base body in the prying direction and the compression component of the rubber base body in the direction perpendicular to the axis can be suppressed while securing the compression component of the rubber base body in the axial direction. That is, the spring constant in the axial direction can be increased while reducing the spring constant in the prying direction and the spring constant in the direction perpendicular to the axis.

According to the anti-vibration device described in a third aspect, in addition to the effects exerted by the anti-vibration device described in the first aspect or the second asepct, there is an effect that preliminary compression in the radial direction (the direction perpendicular to the axis) can be imparted to the first rubber section and the second rubber section while suppressing generation of peeling off and a crack of the first rubber section and the second rubber section.

Here, in the anti-vibration device, in order to secure the durability thereof, preliminary compression in the radial direction is imparted to the rubber base body. Preliminary compression in the radial direction is imparted to the rubber base body normally by subjecting the outer tube member to drawing work. In this case, in the structure of partially forming a spherical surface of a recessed shape in the inner peripheral surface section of the outer tube member (outer tube) as the conventional device, the thickness differs between the section where the recessed spherical surface is formed and the section where the spherical surface of a recessed shape is not formed, the thickness of the section where the spherical surface of a recessed shape is not formed becomes thick, and therefore drawing of the outer tube member becomes difficult.

Therefore, in the conventional device, plural recessed grooves extending in the axial direction and having the depth equivalent to that of the spherical surface of a recessed shape are formed in the inner peripheral surface of the outer tube member so as to be dispersed in the circumferential direction. Thus, as the drawing work progresses, the outer tube member is drawn and deformed so that the groove width of each recessed groove is narrowed, and therefore the drawing work can be executed even when there is a difference in the thickness and the thickness of the section where the spherical surface of a recessed shape is not formed is large.

However, in this conventional device, although the spring constant in the prying direction can be reduced, when the outer tube member is subjected to drawing work, deformation is concentrated to the recessed grooves, peeling occurs at a portion of the rubber-like elastic body adhered to the recessed grooves, and a crack occurs in the rubber base body by being embraced by the recessed grooves whose groove width has been narrowed because it is configured that preliminary compression is imparted to the rubber base body (rubber-like elastic body) by forming the recessed grooves in the outer tube member and enabling drawing work thereof.

On the other hand, according to the third aspect, there is an effect that preliminary compression in the radial direction can be imparted to the first rubber section and the second rubber section because the first outer tube section and the second outer tube section are held and fixed by the tubular member in a state where the first outer tube section and the second outer tube section have been subjected to drawing work. Also, it is not necessary to form the recessed grooves that enable drawing work on the first outer tube section and the second outer tube section because the first outer tube section and the second outer tube section are formed into a shape having the recessed inner peripheral surface from a raw material with a constant plate thickness. Therefore, there is an effect that preliminary compression in the radial direction can be imparted to the first rubber section and the second rubber section while suppressing generation of peeling off and a crack of the first rubber section and the second rubber section.

That is, in the present invention, the shape as the attaching portion to the counterpart member (for example the outline shape that enables pressing in to a press-in hole of a suspension arm) can be shouldered by the tubular member, and, with respect to the first outer tube section and the second outer tube section, it is not required to consider the shape as the attaching portion to the counterpart member because it is configured that the first outer tube section and the second outer tube section are held and fixed by the tubular member. Therefore, the first outer tube section and the second outer tube section can be formed by pressing, for example, from a raw material having a constant plate thickness. As a result, the first outer tube section and the second outer tube section can be subjected to drawing work even when the recessed grooves are not arranged.

According to the anti-vibration device described in a fourth aspect, in addition to the effects exerted by the anti-vibration device described in any one of first to third aspects, the tubular member is subjected to drawing work. That is, because the outer peripheral surface side of the first outer tube section and the second outer tube section is tightened by the inner peripheral surface side of the tubular member, the first outer tube section and the second outer tube section are held and fixed by the tubular member, and therefore there is an effect that such holding and fixing can be executed simply. Also, because the inside diameter of the tubular member before subjecting to drawing work can be made larger than the outside diameter of the first outer tube section and the second outer tube section, there is an effect that the work for inserting the first outer tube section and the second outer tube section to the inner periphery side of the tubular member along the axial direction can be executed efficiently in the assembling step.

In this case, when the outer peripheral surface of the first outer tube section and the second outer tube section and the inner peripheral surface of the tubular member directly contact each other (that is, when the metal materials contact each other), it becomes hard to secure the friction coefficient between both. Also, it becomes hard to secure the allowance for tightening, because the spring back after the drawing work becomes large in the member positioned on the outer periphery side. Therefore, there is a risk that the first outer tube section and the second outer tube section may slip out from the tubular member in the axial direction.

On the other hand, in the present invention, the friction coefficient can be secured by the interposal of the rubber membrane section because a rubber membrane section formed of a rubber-like elastic body is coveringly arranged in at least a part of at least either one of the outer peripheral surface of the first outer tube section and the second outer tube section or the inner peripheral surface of the tubular member. Also, the shortage of the allowance for tightening by the spring back of the tubular member can be compensated by the compression force generated by elastic restoration of the rubber membrane section because the rubber membrane section is interposed. Therefore, there is an effect that the holding force against slipping out in the axial direction can be secured, and the first outer tube section and the second outer tube section are prevented from slipping out from the tubular member in the axial direction.

Also, according to the fourth aspect, there is an effect that the first outer tube section and the second outer tube section can be prevented from playing in the radial direction (the direction perpendicular to the axis) at the inner periphery side of the tubular member because the tubular member is subjected to drawing work.

According to the anti-vibration device described in a fifth aspect, in addition to the effects exerted by the anti-vibration device described in the fourth aspect, it is not required to coveringly arrange the rubber membrane section in the tubular member, and the rubber membrane section can be vulcanizingly molded simultaneously with the first rubber section and the second rubber section because the rubber membrane section is coveringly arranged only on the outer peripheral surface of the first outer tube section and the second outer tube section out of the outer peripheral surface of the first outer tube section and the second outer tube section and the inner peripheral surface of the tubular member, and the rubber membrane section continues to at least either one of the first rubber section or the second rubber section. Therefore, there is an effect that the manufacturing cost can be reduced correspondingly.

According to the anti-vibration device described in a sixth aspect, in addition to the effects exerted by the anti-vibration device described in any one of the first to fifth aspect, the split surface of the first outer tube section and the split surface of the second outer tube section are made apart from each other in the axial direction, the outer peripheral surface of the stopper rubber section and the inner peripheral surface of the tubular member are made apart from each other in the radial direction, and the outer peripheral surface of the stopper rubber section is made capable of abutting upon the inner peripheral surface of the tubular member through the gap between the split surfaces of the first outer tube section and the second outer tube section. Therefore the stopper function can be exerted in which, when a large displacement in the radial direction (the direction perpendicular to the axis) is inputted, the stopper projection section is made to abut upon the inner peripheral surface of the tubular member through the stopper rubber section, and deformation of the rubber base body accompanying the inputted displacement is restricted to a predetermined amount. Thus, there is an effect that durability of the rubber base body can be improved. Particularly, according to the sixth aspect, there is an effect that the space becoming a dead space is utilized and the anti-vibration device can be miniaturized while improving durability of the rubber base body by exerting the stopper function because the portion for exerting the stopper function can be stored within a space formed between the split surface of the first rubber section and the split surface of the second rubber section.

According to the anti-vibration device described in the seventh aspect, in addition to the effects exerted by the anti-vibration device described in any one of the first to fifth aspect, there are effects that the spring constant in the axial direction can be increased while reducing the spring constant in the prying direction and the spring constant in the direction perpendicular to the axis, and that the first outer tube section and the second outer tube section can be prevented from shifting toward the direction of making the split surfaces thereof approach each other with respect to the tubular member.

That is, the outer peripheral surface of the bulge section in the first inner tube section and the recessed inner peripheral surface in the first outer tube section are connected to each other by the first rubber section in a state where the split surface of the first inner tube section and the split surface of the first outer tube section are disposed at the same position in the axial direction, the outer peripheral surface of the bulge section in the second inner tube section and the recessed inner peripheral surface in the second outer tube section are connected to each other by the second rubber section in a state where the split surface of the second inner tube section and the split surface of the second outer tube section are disposed at the same position in the axial direction, the first rubber section is positioned so as to retract in the axial direction from the split surface of the first outer tube section and the split surface of the first inner tube section, and the second rubber section is positioned so as to retract in the axial direction from the split surface of the second outer tube section and the split surface of the second inner tube section. Therefore the first outer tube section and the second outer tube section can be held and fixed by the tubular member in a state where the split surfaces of the first inner tube section and the first outer tube section and the split surfaces of the second inner tube section and the second outer tube section are made to abut upon each other. Thus, the spring constant in the axial direction can be increased while reducing the spring constant in the prying direction and the spring constant in the direction perpendicular to the axis by the space because a space can be formed between the split surface of the first rubber section and the split surface of the second rubber section.

Also, these first outer tube section and second outer tube section can be restricted from moving toward the direction making the split surfaces thereof approach each other because the split surface of the first outer tube section and the split surface of the second outer tube section can be kept abutted upon each other while setting a space between the split surface of the first rubber section and the split surface of the second rubber section. That is, the first outer tube section or the second outer tube section can be securely prevented from shifting with respect to the tubular member when a large displacement in the axial direction is inputted because the movement toward such direction can be restricted without relying on the friction against the inner peripheral surface of the tubular member.

According to the anti-vibration device described in an eighth aspect, in addition to the effects exerted by the anti-vibration device described in the seventh aspect, there is an effect of allowing it to restrict the first outer tube section and the second outer tube section from not only moving in the direction of making the split surfaces thereof approach each other but also from moving in the direction of making the split surfaces thereof apart from each other with respect to the tubular member because the tubular member is subjected to drawing work and one end side in the axial direction and the other end side in the axial direction of the tubular member are formed into a shape of reducing the diameter so as to line the outer peripheral surface that becomes the back surface side of the recessed inner peripheral surface of the first outer tube section and the second outer tube section.

That is, when the first outer tube section and the second outer tube section are to move in the direction of making the split surfaces thereof approach each other, the movement can be restricted by abutment upon each other of the split surfaces thereof, whereas when the first outer tube section and the second outer tube section are to move in the direction of making the split surfaces thereof depart from each other, the movement can be restricted by one end side in the axial direction or the other end side in the axial direction of the tubular member. Thus, the first outer tube section or the second outer tube section can be surely prevented from being shifted with respect to the tubular member, when a large displacement in the axial direction is inputted because the movement in these two directions can be restricted without relying on the friction against the inner peripheral surface of the tubular member.

BRIEF DESCRIPTION OF DRAWINGS

FIG. 3 (a) is a top view of a first outer tube section, and (b) is a cross-sectional view of the first outer tube section taken along the line IIIb-IIIb of FIG. 3(a).

FIG. 4 (a) is a top view of the tubular member, and (b) is a cross-sectional view of the tubular member taken along the line IVb-IVb of FIG. 4(a).

FIG. 5 (a) is a top view of the vulcanized molded body, and (b) is a cross-sectional view of the vulcanized molded body taken along the line Vb-Vb of FIG. 5(a).

FIG. 7 (a) is a cross-sectional view of the vulcanized molded body and the tubular member in a state where the rubber base body is compressed in the axis direction in the rubber base body compressing step, and (b) is a cross-sectional view of the vulcanized molded body and the tubular member in a state after the tubular member is subjected to drawing work in the tubular member drawing step.

FIG. 9 (a) is a cross-sectional view of a vulcanized molded body B forming the anti-vibration device in the second embodiment, and (b) is a cross-sectional view of the anti-vibration device in the second embodiment.

FIG. 10 (a) is a cross-sectional view of a vulcanized molded body forming the anti-vibration device in a third embodiment, and FIG. 10(b) is a cross-sectional view of the anti-vibration device in the third embodiment.

FIG. 11 (a) is a top view of the anti-vibration device in the fourth embodiment, and (b) is a cross-sectional view of the anti-vibration device taken along the line XIb-XIb of FIG. 11(a).

FIG. 13 (a) is a side view of the vulcanized molded body, and (b) is a cross-sectional view of the vulcanized molded body taken along the line XIIIb-XIIIb of FIG. 13(a)

DESCRIPTION OF EMBODIMENTS

Figures 1A, 1B:
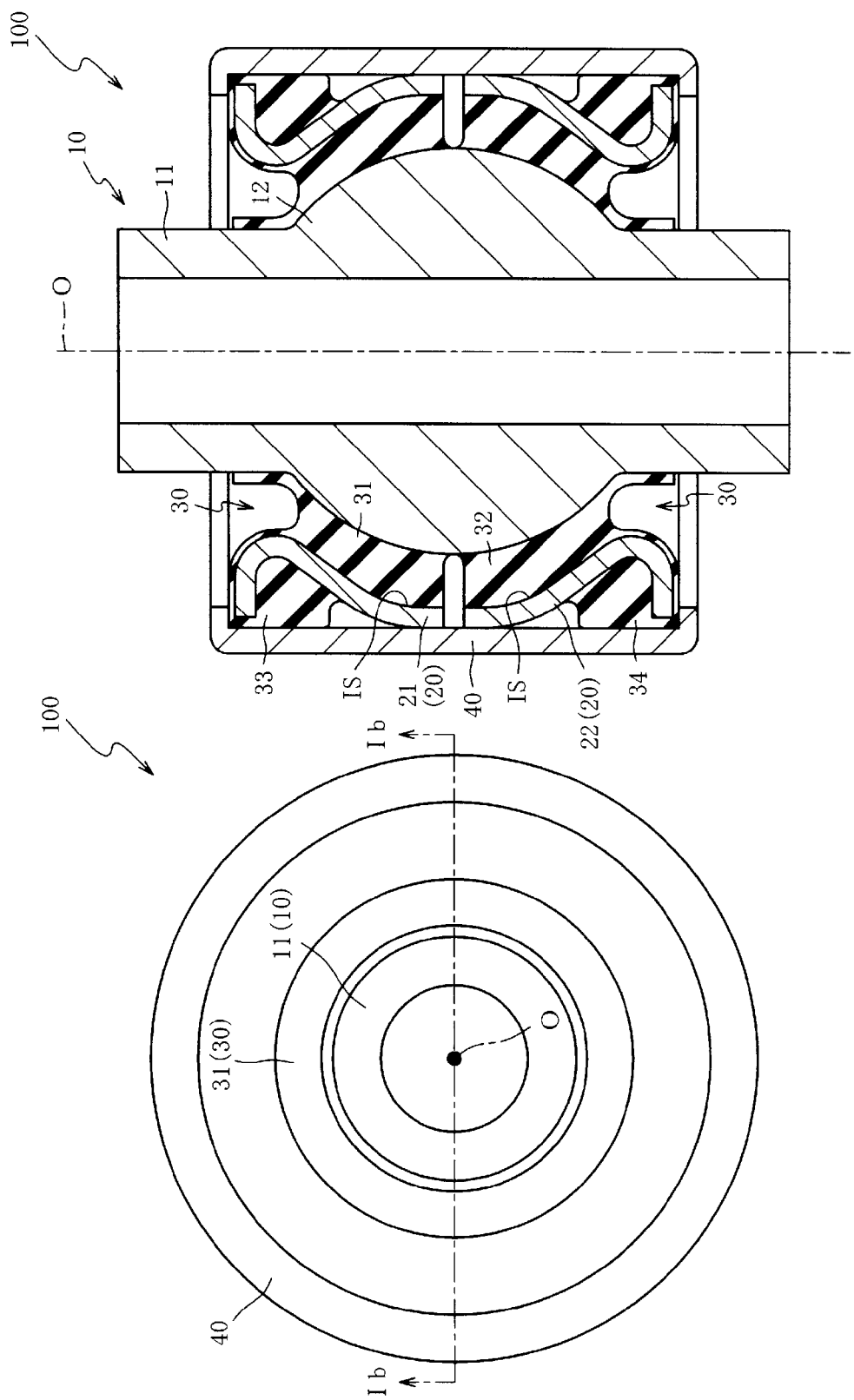
FIG. 1 (a) is a top view of the anti-vibration device in a first embodiment of the present invention Description of Embodiments. (b) is a cross-sectional view of the anti-vibration device taken along the line Ib-Ib of FIG. 1(a).

Hereinafter, preferred embodiments of the present invention will be described referring to the attached drawings. First, the total configuration of an anti-vibration device 100 will be described referring to FIG. 1. FIG. 1(a) is a top view of the anti-vibration device 100 in a first embodiment of the present invention, and FIG. 1(b) is a cross-sectional view of the anti-vibration device 100 taken along the line Ib-Ib of FIG. 1(a).

As shown in FIG. 1, the anti-vibration device 100 is an anti-vibration bush used for a suspension device of an automobile, and includes an inner tube member 10 of a tubular shape, an outer tube member 20 disposed on the outer periphery side of the inner tube member 10, a rubber base body 30 connecting these inner tube member 10 and the outer tube member 20 to each other and formed of a rubber-like elastic body, and a tubular member 40 of a tubular shape disposed on the outer periphery side of the outer tube member 20.

In the anti-vibration device 100, the end surfaces in the axis O direction of the inner tube member 10 are gripped and fixed through an attaching bolt inserted into the inner tube member 10 between a pair of gripping sections in a bracket of a suspension member, the tubular member 40 is pressed in to a press-in hole in one end of a suspension arm (a lower arm in the present embodiment), and thereby the anti-vibration device 100 is mounted on the suspension device of an automobile.

Next, a detailed configuration of each section composing the anti-vibration device 100 will be described referring to FIG. 2 to FIG. 4. First, the detailed configuration of the inner tube member 10 will be described referring to FIG. 2. FIG. 2(a) is a top view of the inner tube member 10, and FIG. 2(b) is a cross-sectional view of the inner tube member 10 taken along the line IIb-IIb of FIG. 2(a).

As shown in FIG. 2, the inner tube member 10 includes a shaft section 11 of a tubular shape where an insertion hole allowing an attaching bolt to be inserted is formed so as to penetrate therethrough along the axis O and a bulge section 12 of a spherical shape bulging outward in the radial direction from the outer peripheral surface of the shaft section 11, and they are integrally formed of a metal material. Also, the shaft section 11 and the bulge section 12 may be formed separately of different materials (for example, the bulge section 12 may be formed of a resin material).

Figure 2B:
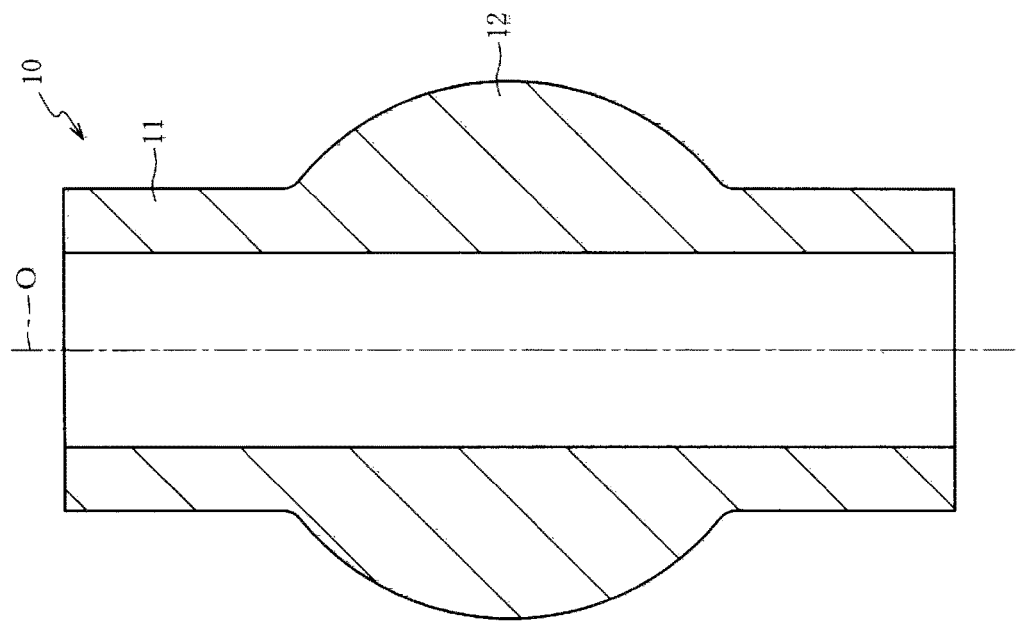
FIG. 2(a) is a top view of the inner tube member, and (b) is a cross-sectional view of the inner tube member taken along the line IIb-IIb of FIG. 2(a).
Figure 2A:
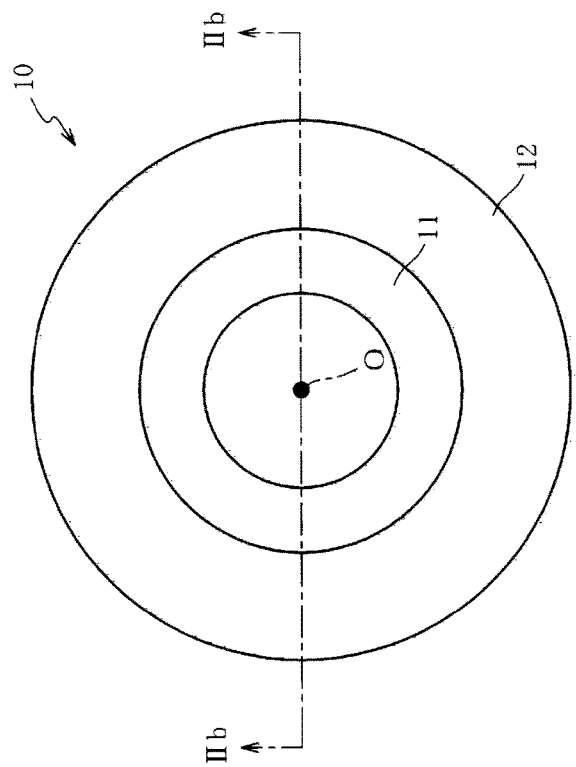

The bulge section 12 is disposed in the center in the axis O direction (in the center in the vertical direction of FIG. 2(b)) of the shaft section 11, and the center of the projected spherical surface in the bulge section 12 is positioned on the axis O of the shaft section 11. That is, the inner tube member 10 is formed into a rotation symmetry shape having the symmetry axis (rotation center) of the axis O.

The detailed configuration of the outer tube member 20 will be described referring to FIG. 3. FIG. 3(a) is a top view of a first outer tube section 21, and FIG. 3(b) is a cross-sectional view of the first outer tube section 21 taken along the line IIIb-IIIb of FIG. 3(a). Also, in FIG. 3, a state before executing the drawing work (refer to FIG. 6) in the outer tube drawing step is illustrated.

Also, the outer tube member 20 is split into the first outer tube section 21 and a second outer tube section 22 at the center part in the axis O direction (refer to FIG. 1). These first outer tube section 21 and second tube section 22 are of the same member (configuration) and only the names are different, and therefore the first outer tube section 21 will be hereinafter described, and description on the second outer tube section 22 will be omitted.

As shown in FIG. 3, the first outer tube section 21 is a member obtained by forming a metal material (iron and steel material in the present embodiment) of a plate shape having a constant plate thickness into a container shape by pressing, and is formed into rotation symmetry having the symmetry axis (rotation center) of the axis O.

Also, it is not necessary to form the recessed grooves for enabling drawing work as in the conventional device, because the first outer tube section 21 is formed of a raw material having a constant plate thickness. Therefore, in the outer tube drawing step (refer to FIG. 6) for subjecting the first outer tube section 21 and the second outer tube section 22 to drawing work, preliminary compression in the radial direction (the direction perpendicular to the axis O) can be imparted to a first rubber section 31 and a second rubber section 32 while suppressing generation of peeling off and a crack in the first rubber section 31 and the second rubber section 32.

That is, the shape as the attaching portion to the counterpart member (the outline shape that enables pressing in to a press-in hole of the lower arm in the present embodiment) can be shouldered by the tubular member 40, and, with respect to the first outer tube section 21, it is not required to consider the shape as the attaching portion to the counterpart member because the first outer tube section 21 (and the second outer tube section 22) is held and fixed by the tubular member 40 (refer to FIG. 1). Therefore, the first outer tube section 21 can be formed by pressing from a raw material having a constant plate thickness. As a result, the first outer tube section 21 (and the second outer tube section 22) can be subjected to drawing work even when the recessed grooves are not arranged.

The first outer tube section 21 includes an annular section 20a formed into an annular plate shape perpendicular to the axis O, a curved section 20b connected to the inner edge of the annular section 20a and having the cross-sectional shape curved in an arc shape, a diameter expansion section 20c connected to the distal end (the lower side of FIG. 3(b)) of the curved section 20b and having a conical tube shape whose inside diameter gradually expands as it departs from the curved section 20b, and a cylindrical section 20d connected to the maximum diameter side of the diameter expansion section 20c and having a cylindrical shape formed to have a generally constant inside diameter, and these respective sections 20a to 20d are integrally formed so as to be coaxial with each other along the axis O.

The diameter expansion section 20c and the cylindrical section 20d are connected to each other smoothly to have an arc shape cross section. Also, when the annular section 20a is formed into an annular plate shape perpendicular to the axis O and the end in the axis O direction of the tubular member 40 is bent inward in the radial direction in the bending step described below (refer to FIG. 8), the bent section overlaps with the annular section 20a in the axis O direction (refer to FIG. 1). Therefore, engagement of the bent section of the tubular member 40 and the annular section 20a can be made solid.

Here, the inner peripheral surface of the diameter expansion section 20c and the cylindrical section 20d becomes the recessed inner peripheral surface IS. The recessed inner peripheral surface IS is a portion surrounding the bulge section 12 of the inner tube member 10. By subjecting the diameter expansion section 20c and the cylindrical section 20d to drawing work in the outer tube drawing step (refer to FIG. 6), the shape of the recessed inner peripheral surface IS is formed into a spherical surface of a recessed shape concentric with the spherical surface of a recessed shape in the bulge section 12 of the inner tube member 10 (refer to FIG. 1).

Also, in the present embodiment, as shown in FIG. 3, the outside diameter of the annular section 20a (the diameter at the outer edge of the annular section 20a) D1 is made smaller than the outside diameter of the cylindrical section 20d (the diameter at the outer peripheral surface of the cylindrical section 20d) D2 (D1<D2). Thus, the shape of the recessed inner peripheral surface IS can be made to resemble the shape of the spherical surface of a recessed shape which is concentric with the spherical surface of a projected shape in the bulge section 12 of the inner tube member 10 because only the portion of the cylindrical section 20d can be made to abut upon the die pieces (not shown) and can be pressed (moved) inward in the radial direction by the die pieces in the outer tube drawing step (refer to FIG. 6).

The tubular member 40 will be described referring to FIG. 4. FIG. 4(a) is a top view of the tubular member 40, and FIG. 4(b) is a cross-sectional view of the tubular member 40 taken along the line IVb-IVb of FIG. 4(a). Also, in FIG. 4, a state before the tubular member drawing work (refer to FIG. 7) (that is the tubular member 40 before drawing work) is illustrated.

As shown in FIG. 4, the tubular member 40 is a member formed of a metal material (iron and steel material in the present embodiment) into a tubular shape having the axis O. That is, the tubular member 40 is formed into a shape of rotation symmetry having the symmetry axis (rotation axis) of the axis O.

The inside diameter of the tubular member 40 is made larger than the maximum diameter of a vulcanized molded body A (the diameter at the outer peripheral surface of rubber membrane sections 33, 34) after subjecting the vulcanized molded body A to drawing work by the outer tube drawing step described below (refer to FIG. 6(b)). In the present embodiment, the inside diameter of the tubular member 40 is made larger than the maximum outside diameter of the vulcanized molded body A before drawing work (the outside diameter D2 of the cylindrical section 20d). Thus, in the assembling work for the anti-vibration device 100, work for inserting the vulcanized molded body A to the inner periphery side of the tubular member 40 along the axis O direction can be executed efficiently (refer to FIG. 7(a)).

Also, in the ends in the axis O direction (the vertical direction of FIG. 4(b)) of the tubular member 40, the corner on the inner peripheral surface side is subjected to chamfering work, and chamfered surfaces 40a of the linear cross-sectional shape are formed. By shaping these chamfered surfaces 40a as well, workability of insertion of the vulcanized molded body A to the inner periphery side of the tubular member 40 along the axis O direction can be improved. Further, with the provision of the chamfered surfaces 40a, in the bending step (refer to FIG. 8) described below, the ends in the axis O direction of the tubular member 40 can be easily bent inward in the radial direction.

Next, the manufacturing method of the anti-vibration device 100 will be described referring to FIG. 5 to FIG. 8. First, the manufacturing method of the vulcanized molded body A will be described and then the configuration of the rubber base body 30 will be described as well referring to FIG. 5. FIG. 5(a) is a top view of the vulcanized molded body A, and FIG. 5(b) is a cross-sectional view of the vulcanized molded body A taken along the line Vb-Vb of FIG. 5(a).

As shown in FIG. 5, the vulcanized molded body A is a component molded by a vulcanizing mold, and constitutes an element of the anti-vibration device 100. That is, the anti-vibration device 100 is constituted by mounting the tubular member 40 on the vulcanized molded body A. The vulcanized molded body A is manufactured by setting the inner tube member 10 and the outer tube member 20 (the first outer tube section 21 and the second outer tube section 22) inside the vulcanizing mold, filling a rubber material after mold clamping, and vulcanizingly molding the rubber base body 30. Thus, the outer peripheral surface of the inner tube member 10 and the inner peripheral surface of the outer tube member 20 (the first outer tube section 21 and the second outer tube section 22) are connected to each other by the rubber base body 30, and the vulcanized molded body A is manufactured.

Also, the first outer tube section 21 and the second outer tube section 22 are set inside the vulcanizing mold so as to be coaxial with each other with the cylindrical sections 20d thereof opposing each other. The vulcanizing mold includes a core positioned at the center in the axis O direction (the vertical direction of FIG. 5(b)) of the inner tube member 10. The shape of the core after clamping becomes an annular shape, and, in clamping, the inner periphery front edge of the core is tightly attached to the outer peripheral surface, namely the crown of the spherical surface of the bulge section 12.

Thus, the first outer tube section 21 and the second outer tube section 22 are installed inside the vulcanizing mold in a state where the split surfaces thereof (the end surface in the axis O direction of the cylindrical section 20d; the lower surface of FIG. 3(b)) are made apart in the axis O direction from each other, and the rubber base body 30 is vulcanizingly molded to a state of being split into the first rubber section 31 and the second rubber section 32 in the axis O direction because the core is interposed between the split surfaces of the first outer tube section 21 and the second outer tube section 22. That is, the rubber base body 30 (the first rubber section 31 and the second rubber section 32) of the vulcanized molded body A forms a state where the split surface of the first outer tube section 21 and the split surface of the second outer tube section 22 depart from each other in the axis O direction and are apart from each other at a predetermined gap.

The first rubber section 31 is a portion that connects the outer peripheral surface of the bulge section 12 of the inner tube member 10 and the recessed inner peripheral surface IS in the first outer tube section 21 to each other, and the second rubber section 32 is a portion that connects the outer peripheral surface of the bulge section 12 of the inner tube member 10 and the recessed inner peripheral surface IS in the second outer tube section 22 to each other. These first rubber section 31 and second rubber section 32 are disposed so that the split surfaces thereof are apart from each other at a predetermined gap. The gap between these split surfaces is formed so as to be narrowed as it approaches the bulge section 12 of the inner tube member 10 from the first outer tube section 21 and the second outer tube section 22.

Also, the first rubber section 31 and the second rubber section 32 do not have to be entirely split (divided) in the axis O direction. For example, the first rubber section 31 and the second rubber section 32 may be connected to each other by a part of the rubber base body 30 (a membrane-like body, for example) that covers the outer peripheral surface of the bulge section 12 of the inner tube member 10.

The rubber base body 30 includes the rubber membrane sections 33, 34 which are coveringly arranged on the outer peripheral surface of the first outer tube section 21 and the second outer tube section 22. The rubber membrane sections 33, 34 are portions forming the outer peripheral surface of a circular shape in the top view having the center of the axis O, are formed in the range from the annular section 20a to the middle of the diameter expansion section 20c, and continue to the first rubber section 31 or the second rubber section 32 through the upper surface or the lower surface of the annular section 20a (for example, the upper side surface of FIG. 5(b) in the rubber membrane sections 33) and the inner peripheral surface of the curved section 20b.

Also, in the present embodiment, as shown in FIG. 5, the outside diameter D3 of the rubber membrane sections 33, 34 (the diameter at the outer peripheral surface of the rubber membrane sections 33, 34) is made smaller than the outside diameter D2 of the cylindrical section 20d (the diameter at the outer peripheral surface of the cylindrical section 20d) (D3<D2).

Here, the covering range of the rubber membrane sections 33, 34 is the range to the middle of the diameter expansion section 20c, and the rubber membrane sections 33, 34 are not coveringly arranged in the cylindrical section 20d and the remaining part of the diameter expansion section 20c that is on the cylindrical section 20d side thereof (that is, the outer peripheral surface is exposed). Thus, in the outer tube drawing step (refer to FIG. 6), the cylindrical section 20d can be directly pressed by a drawing die (not shown), not through the rubber membrane sections 33, 34, and drawing work for the cylindrical section 20d and the diameter expansion section 20c can be executed highly precisely.

The rubber membrane sections 33, 34 include receiving recesses 33a, 34a arranged recessedly toward the diameter expansion section 20c from the outer peripheral surfaces thereof and positioned on the cylindrical section 20d side. Thus, the abutment area of the vulcanizing mold and the diameter expansion section 20c can be secured and the sealing performance in vulcanizing molding can be improved, and therefore formation of the rubber membrane sections 33, 34 on the outer peripheral surface of the cylindrical section 20d can be suppressed. Also, because the receiving recesses 33a, 34a are recessedly arranged, in the tubular member drawing step (refer to FIG. 7), a space can be formed between the inner peripheral surface of the tubular member 40 and the outer peripheral surface of the diameter expansion section 20c, and the rubber membrane sections 33, 34 that have become the pads can be received in the space.

The assembling method for assembling the anti-vibration device 100 from the vulcanized molded body A and the tubular member 40 will be described referring to FIG. 6 to FIG. 8. Assembling of the anti-vibration device 100 is conducted by executing in order the outer tube drawing step (refer to FIG. 6) for subjecting the outer tube member 20 (the first outer tube section 21 and the second outer tube section 22) to drawing work, the rubber base body compressing step (refer to FIG. 7) for compressing the rubber base body 30 (the first rubber section 31 and the second rubber section 32) in the axis O direction, the tubular member drawing step (refer to FIG. 7) for subjecting the tubular member 40 for drawing work, and the bending step (refer to FIG. 8) for subjecting the ends in the axis O direction of the tubular member 40 to bending work.

The outer tube drawing step will be described referring to FIG. 6. FIG. 6(a) is a cross-sectional view of the vulcanized molded body A in a state before drawing work is executed in the outer tube drawing step, and FIG. 6(b) is a cross-sectional view of the vulcanized molded body A in a state after drawing work is executed in the outer tube drawing step.

The drawing die for subjecting the outer tube member 20 (the first outer tube section 21 and the second outer tube section 22) to drawing work includes an annular die and an annular holder that holds and guides the annular die from the outer periphery side (both are not shown). The die is split into plural die pieces in the peripheral direction and a tapered surface is formed on the outer peripheral surface. In the holder, a tapered surface corresponding to the tapered surface of the die is shaped in the inner periphery.

In the outer tube drawing step, the holder installed on a deck of a press apparatus is made to hold the die, the vulcanized molded body A is set on the inner periphery side of the die, and the die is thereafter moved relatively to the holder by a pressing force of the press apparatus. Each die piece is moved so as to approach each other inward in the radial direction of the vulcanized molded body A and toward the axis O as a result of the tapered surface on the outer peripheral surface thereof guided by the tapered surface on the inner peripheral surface of the holder by such relative movement, and the diameter dimension of the die is reduced.

Figures 6A, 6B:
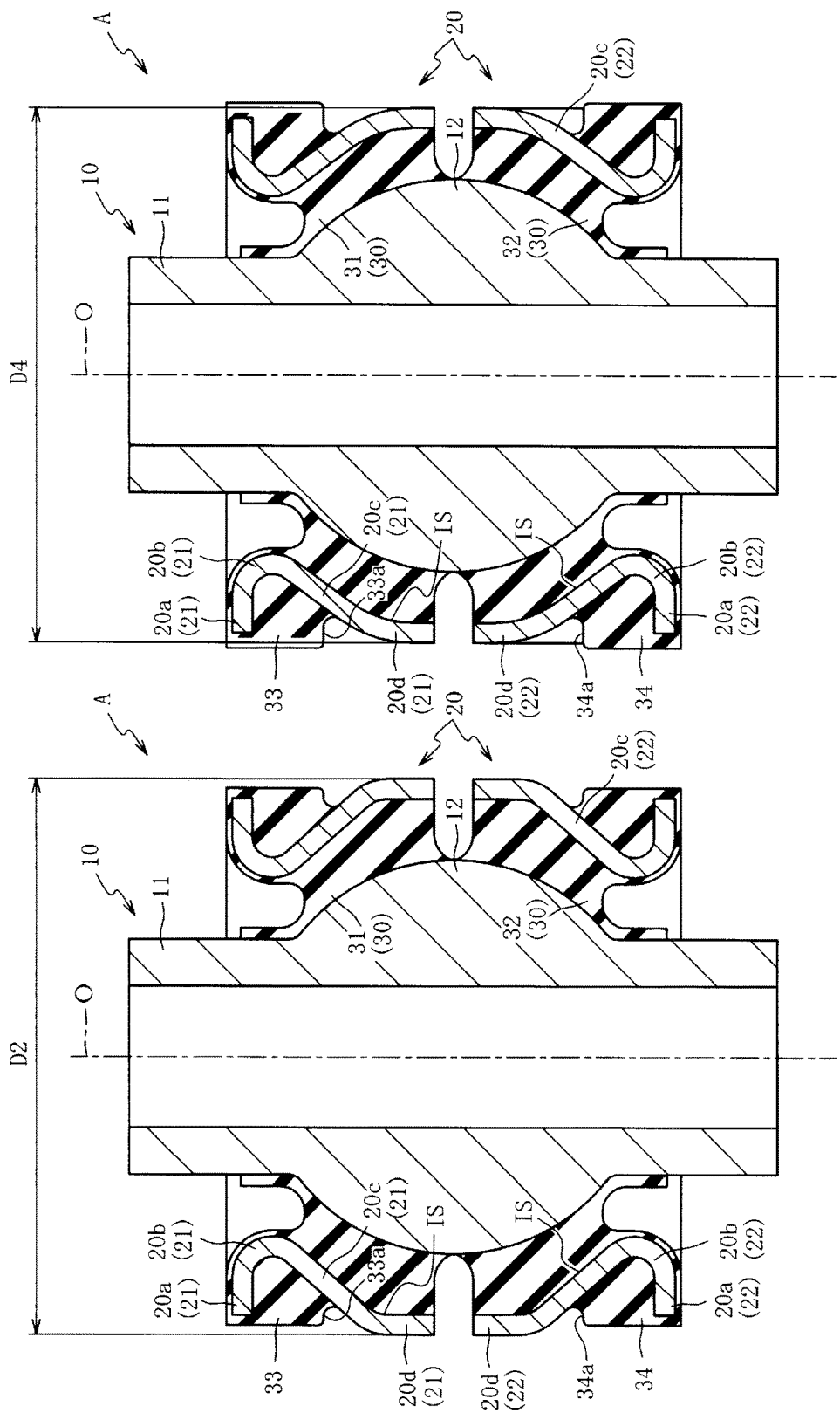
FIG. 6 (a) is a cross-sectional view of the vulcanized molded body in a state before drawing work is executed in the outer tube drawing step, and (b) is a cross-sectional view of the vulcanized molded body in a state after drawing work is executed in the outer tube drawing step.

Thus, as shown in FIG. 6(b), the outer peripheral surfaces of the cylindrical sections 20d of the first outer tube section 21 and the second outer tube section 22 are pressed inward in the radial direction by the inner peripheral surfaces of the respective die pieces, and the first outer tube section 21 and the second outer tube section 22 are subjected to drawing work.

By this outer tube drawing step, the diameter of the cylindrical sections 20d of the first outer tube section 21 and the second outer tube section 22 is reduced from the outside diameter D2 to the outside diameter D4 (D4<D2). Thus, preliminary compression in the radial direction (the direction perpendicular to the axis O) can be imparted to the rubber base body 30 (the first rubber section 31 and the second rubber section 32).

Also, with the diameter reduction of the cylindrical section 20d, the diameter expansion section 20c and the cylindrical section 20d are subjected to drawing deformation so as to be bent inward in the radial direction around the fulcrum of the curved section 20b side, and thereby these diameter expansion section 20c and cylindrical section 20d are bent. As a result, the shape of the recessed inner peripheral surface IS can be made to resemble the shape of the recessed spherical surface which is concentric with the spherical surface of a projected shape in the bulge section 12 of the inner tube member 10.

Also, in the present embodiment, the outside diameter D2 is 53.6 mm, and the outside diameter D4 is 52.0 mm. Further, the outside diameter D4 is made smaller than the outside diameter D3 of the rubber membrane sections 33, 34 (refer to FIG. 5) (D4<D3). That is, in the vulcanized molded body A after subjecting to the outer tube drawing step and shown in FIG. 6(b), the diameter of the rubber membrane sections 33, 34 is made larger than that of the cylindrical section 20d, and the outer peripheral surfaces of the rubber membrane sections 33, 34 are disposed outward in the radial direction (at positions departing from the axis O) from the outer peripheral surface of the cylindrical section 20d.

The rubber base body compressing step and the tubular member drawing step will be described referring to FIG. 7. FIG. 7(a) is a cross-sectional view of the vulcanized molded body A and the tubular member 40 in a state where the rubber base body 30 is compressed in the axis O direction in the rubber base body compressing step, and FIG. 7(b) is a cross-sectional view of the vulcanized molded body A and the tubular member 40 in a state after the tubular member 40 is subjected to drawing work in the tubular member drawing step.

As shown in FIG. 7(a), in the rubber base body compressing step, first, the vulcanized molded body A is inserted to the tubular member 40 along the axis O direction, and the vulcanized molded body A is installed on the inner periphery side of the tubular member 40. Then, the first outer tube section 21 and the second outer tube section 22 of the vulcanized molded body A are relatively moved in the axis O direction so that the split surfaces of both of these outer tube sections 21, 22 (the ends in the axis O direction of the cylindrical sections 20d; the surface on the lower side of FIG. 3(b)) approach each other.

More specifically, the annular section 20a of the first outer tube section 21 and the annular section 20a of the second outer tube section 22 are sandwiched between the end surfaces of a pair of tubular jigs J, and the upper jig J is pressed down by a predetermined amount in the axis O direction toward the lower jig J. Also, in the present embodiment, as shown in FIG. 7(a), the pair of jigs J is fixed at a position where a predetermined gap is formed between the split surface of the first outer tube section 21 and the split surface of the second outer tube section 22.

As shown in FIG. 7(b), drawing work for the tubular member 40 by the tubular member drawing step is executed in a state where the pair of jigs J is fixed (that is, while maintaining a state where the rubber base body 30 (the first rubber section 31 and the second rubber section 32) is compressed in the axis O direction). Also, because the configuration of the drawing die for subjecting the tubular member 40 to drawing work and the action thereof are similar to those of the drawing die used in the outer tube drawing step, description thereof will be omitted.

Here, the object of drawing work for the tubular member 40 is to hold the first outer tube section 21 and the second outer tube section 22 inside the tubular member 40 by pressing the cylindrical sections 20*d* of the first outer tube section 21 and the second outer tube section 22 inward in the radial direction by the inner peripheral surface of the tubular member 40 and imparting a predetermined tightening allowance (approximately 0.01 mm to 0.02 mm in terms of the radius in the present embodiment) to the cylindrical sections 20*d*. Thus, the press apparatus can be miniaturized because the tightening allowance is set to a small value and drawing work can be executed by the motion of the drawing die at a comparatively low pressing force. Also, in this case, as described below, the inner peripheral surface of the tubular member 40 and the rubber membrane sections 33, 34 are tightly attached to each other by the elastic restoration force of the compressed rubber membrane sections 33, 34.

The bending step will be described referring to FIG. 8. FIG. 8(*a*) is a cross-sectional view of the vulcanized molded body A and the tubular member 40 in a state before the bending work is executed in the bending step, and FIG. 8(*b*) is a cross-sectional view of the vulcanized molded body A and the tubular member 40 in a state after the bending work is executed in the bending step.

The caulking die for subjecting the end in the axis O direction of the tubular member 40 to bending work includes a pair of annular dies and a holder that holds the pair of dies so as to be movable in the axis O direction. In the opposing surface of the pair of dies, a curved recess whose shape of the cross section cut by a flat plane including the axis O is a recess curved in an arc shape is recessedly arranged at a portion upon which the end in the axis O direction of the tubular member 40 abuts.

In the bending step, the vulcanized molded body A and the tubular member 40 in the state shown in FIG. 8(*a*) are set between the pair of dies of the caulking die installed on the deck of the press apparatus, and the pair of dies is thereafter relatively moved in the direction of approaching to each other by the pressing force of the press apparatus. With such relative movement, the ends in the axis O direction of the tubular member 40 are deformed along the inner surface shape of the curved recess of the die, and are bent inward in the radial direction. As a result, as shown in FIG. 8(*b*), the tubular member 40 is mounted on the vulcanized molded body A and assembling of them (manufacturing of the anti-vibration device 100) is completed.

Here, the first outer tube section 21 and the second outer tube section 22 can be held on the inner periphery side thereof even in a state where the pair of jigs J are detached because the tubular member 40 has been subjected to drawing work in the tubular member drawing step described above (refer to FIG. 7), as shown in FIG. 8(*a*).

In this case, when the outer peripheral surfaces of the first outer tube section 21 and the second outer tube section 22 and the inner peripheral surface of the tubular member 40 directly contact each other (that is, when the metal materials contact each other), the friction coefficient between both is hardly secured. Also, the tightening allowance is hardly secured, because the spring back after drawing work becomes large in the tubular member 40 positioned on the outer periphery side. Therefore, there is a risk that the first outer tube section 21 and the second outer tube section 22 may slip out in the axis O direction from the tubular member 40.

On the other hand, in the present embodiment, because the rubber membrane sections 33, 34 formed of a rubber-like elastic body are hoveringly arranged in a part of the outer peripheral surface of the first outer tube section 21 and the second outer tube section 22, the friction coefficient can be secured by interposing of such rubber membrane sections. Also, because the rubber membrane sections 33, 34 are interposed, shortage of the tightening allowance by the spring back of the tubular member 40 can be compensated by the compressing force generated by the elastic restoration of the rubber membrane sections 33, 34. Therefore, the holding force against slipping out in the axis O direction can be secured, and the first outer tube section 21 and the second outer tube section 22 can be prevented from slipping out in the axis O direction from the tubular member 40. Thus, with respect to the caulking die used in the bending step, because it is not necessary to consider the relation with the jigs J (that is, the bending work can be executed in a state where the jigs J have been detached), the structure thereof can be simplified.

Also, by detaching the pair of jigs J, even when the first outer tube section 21 and the second outer tube section 22 are shifted (are moved in the direction of slipping out) to some extent in the axis O direction with respect to the tubular member 40, in subjecting the ends in the axis O direction of the tubular member 40 to bending work in the bending step, the first outer tube section 21 and the second outer tube section 22 can be pushed back by the bent portions, and the position in the axis O direction can be defined (can be arranged at an appropriate position).

Further, in using the anti-vibration device 100, the vulcanized molded body A can be prevented from playing in the radial direction (the direction perpendicular to the axis O) on the inner periphery side of the tubular member 40 because the tubular member 40 is subjected to drawing work and the inner peripheral surface thereof is tightly attached to the first outer tube section 21 and the second outer tube section 22 as well as the rubber membrane sections 33, 34.

As described above, according to the anti-vibration device 100, the rubber base body 30 can be deformed mainly in the shearing direction because the rubber base body 30 (the first rubber section 31 and the second rubber section 32) connects the outer peripheral surface of the bulge section 12 of the inner tube member 10 and the recessed inner peripheral surface IS of the outer tube member 20 (the first outer tube section 21 and the second outer tube section 22) (that is, the concentric recessed spherical surface surrounding the bulge section 12 of the inner tube member 10) each other, with respect to an input of the displacement in the prying direction. Therefore, the spring constant in the prying direction of the anti-vibration device 100 can be reduced.

In this case, with respect to the vulcanized molded body A, the first rubber section 31 and the second rubber section 32 are vulcanizingly molded into a state where the split surface of the first outer tube section 21 and the split surface of the second outer tube section 22 are made apart in the axis O direction from each other (made apart from each other at a predetermined gap) by the vulcanizing step (refer to FIG. 6(*a*)). The vulcanized molded body A vulcanizingly molded into such form is held and fixed by the tubular member 40 in a state where the first outer tube section 21 and the second outer tube section 22 are relatively moved in the axis O direction relatively to each other and the split surfaces are made to approach each other by the rubber base body compressing step (refer to FIG. 6(b) and FIG. 7(a)), the tubular member drawing step (refer to FIG. 7(a) and FIG. 7(b)), and the bending step (refer to FIG. 8(a) and FIG. 8(b)). Thus, the preliminary compression in the axis O direction can be imparted to the first rubber section 31 and the second rubber section 32.

Also, such preliminary compression in the axis O direction could not be imparted in a structure utilizing the diameter reduction of the outer tube member in relation to drawing work as the conventional device, and can be imparted only by employing the structure of holding and fixing the first outer tube section 21 and the second outer tube section 22 that have been moved relatively to each other in the axis O direction by the tubular member 40, like the anti-vibration device 100. Thus, the spring constant in the axis O direction can be increased, and durability against the displacement in the axis O direction can be improved.

Figures 8A, 8B:
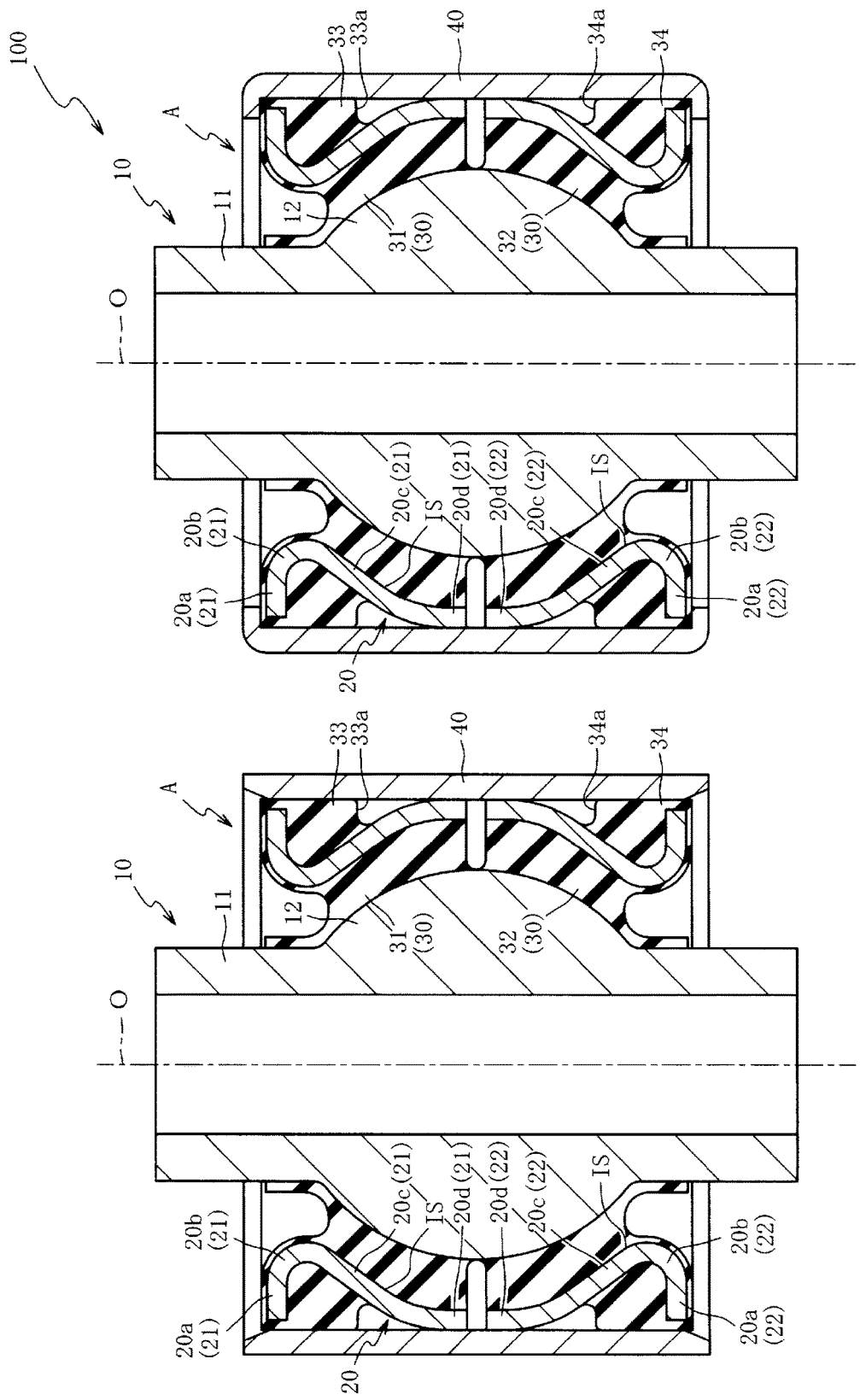
FIG. 8 (a) is a cross-sectional view of the vulcanized molded body and the tubular member in a state before the bending work is executed in the bending step, and (b) is a cross-sectional view of the vulcanized molded body and the tubular member in a state after the bending work is executed in the bending step.

Also, according to the anti-vibration device 100, as described above, the vulcanized molded body A is configured to be vulcanizingly molded in a state where the split surface of the first outer tube section 21 and the split surface of the second outer tube section 22 are made apart in the axis O direction from each other (made apart from each other at a predetermined gap) (refer to FIG. 6(a)), to move the first outer tube section 21 and the second outer tube section 22 relatively to each other in the axis O direction after the vulcanizingly molding (refer to FIG. 6(b) and FIG. 7(a)), and to be held and fixed by the tubular member 40 (refer to FIG. 8(b)), and therefore the relative distance in the axis O direction between the first outer tube section 21 and the second outer tube section 22 (that is, the departing distance in the axis O direction (the distance in the vertical direction in FIG. 8(b)) between the split surfaces when the vulcanized molded body A is held and fixed by the tubular member 40) can be adjusted. Thus, the value of the spring constant in the axis O direction can be increased and reduced because the preliminary compression amount in the axis O direction imparted to the first rubber section 31 and the second rubber section 32 can be adjusted.

Also, in this case, it is necessary to adjust the bending deformation amount of the ends in the axis O direction of the tubular member 40, and the shape of the curved recess of the caulking die used in the bending step (refer to FIG. 8) is adjusted. When the adjustment of the amount of the bending deformation (the shape of the curved recess) is still insufficient, the dimension in the axis O direction of the tubular member 40 is changed.

Next, an anti-vibration device 200 in a second embodiment will be described referring to FIG. 9. Also, the same parts with those of the first embodiment described above will be marked with the same reference signs, and description thereof will be omitted. FIG. 9(a) is a cross-sectional view of a vulcanized molded body B forming the anti-vibration device 200 in the second embodiment, and FIG. 9(b) is a cross-sectional view of the anti-vibration device 200 in the second embodiment. Also, in FIG. 9(a), the vulcanized molded body B of a state before the outer tube member 20 is subjected to drawing work by the outer tube drawing step is illustrated.

With the exception that the configuration (the range of formation) of rubber membrane sections 233, 234 is different from that of the rubber membrane sections 33, 34 in the first embodiment, the vulcanized molded body B in the second embodiment is the same as the vulcanized molded body A in the first embodiment with respect to the other configurations. Also, the manufacturing method of the anti-vibration device 200 is the same as the case of the anti-vibration device 100. Therefore, description on them will be omitted.

As shown in FIG. 9(a), the rubber membrane sections 233, 234 in the second embodiment are coveringly arranged over the entire outer peripheral surface of the first outer tube section 21 and the second outer tube section 22. That is, although the covering range of the rubber membrane sections 33, 34 in the first embodiment was the range from the annular section 20a to the middle of the diameter expansion section 20c (refer to FIG. 5(b)), the covering range is extended and the rubber membrane sections 233, 234 are also coveringly arranged on the outer peripheral surface of the diameter expansion section 20c and the outer peripheral surface of the cylindrical section 20d.

Similarly to the case of the first embodiment, the rubber membrane sections 233, 234 form an outer peripheral surface of a circular shape in the top view having the center of the axis O. The outside diameter of these rubber membrane sections 233, 234 (the diameter at the outer peripheral surface of the rubber membrane sections 233, 234) is made smaller than the inside diameter of the tubular member 40.

According to the anti-vibration device 200 in the second embodiment, because the covering range of the rubber membrane sections 233, 234 is expanded, the contact area with the inner peripheral surface of the tubular member 40 can be increased. Thus, the vulcanized molded body B can be more securely prevented from slipping out in the axis O direction from the inner periphery side of the tubular member 40 after the tubular member 40 is subjected to drawing work by the tubular member drawing step until shifting to the bending step (refer to FIG. 8) because the holding force for the vulcanized molded body B by the tubular member 40 can be secured.

Next, an anti-vibration device 300 in a third embodiment will be described referring to FIG. 10. Also, the same parts with those of each embodiment described above will be marked with the same reference signs, and description thereof will be omitted. FIG. 10(a) is a cross-sectional view of a vulcanized molded body C forming the anti-vibration device 300 in a third embodiment, and FIG. 10(b) is a cross-sectional view of the anti-vibration device 300 in the third embodiment.

With the exception that the configuration of a first outer tube section 321 and a second outer tube section 322 is different from that of the first outer tube section 21 and the second outer tube section 22 in the first embodiment, the vulcanized molded body C in the third embodiment is the same as the vulcanized molded body A in the first embodiment with respect to the other configurations. However, with respect to the rubber membrane sections 233, 234, the configuration is the same as that of the vulcanized molded body B in the second embodiment. Also, with the exception of omission of the outer tube drawing step (refer to FIG. 6; drawing work for an outer tube member 320), the manufacturing method of the anti-vibration device 300 is the same as the case of the anti-vibration device 100 with respect to the other steps. Therefore, description on them will be omitted.

As shown in FIG. 10(a), the outer tube member 320 in the third embodiment is a solid member formed by casting (a member made of die-cast aluminum in the present embodiment), includes the recessed inner peripheral surface IS that is formed as the spherical surface of a recessed shape on the inner periphery side, and is split into two of the first outer tube section 321 and the second outer tube section 322 in the center part in the axis O direction of the recessed inner peripheral surface IS. These first outer tube section 321 and second outer tube section 322 are the same member (configuration).

Similarly to the case of the vulcanized molded body A in the first embodiment, the vulcanized molded body C is vulcanizingly molded into a state where the split surface of the first outer tube section 321 and the split surface of the second outer tube section 322 depart from each other in the axis O direction and are apart from each other at a predetermined gap. The recessed inner peripheral surface IS is formed into a spherical surface of a recessed shape which is concentric with the spherical surface of a projected shape in the bulge section 12 of the inner tube member 10 as a result of the first outer tube section 321 and the second outer tube section 322 relatively moved in the axis O direction so that the split surfaces of both of these outer tube sections 321, 322 approach each other in the rubber base body compressing step (refer to FIG. 7).

According to the anti-vibration device 300, the spring constant in the prying direction can be reduced because the rubber base body 30 (the first rubber section 31 and the second rubber section 32) can be deformed mainly in the shearing direction with respect to an input of the displacement in the prying direction.

Also, preliminary compression in the axis O direction can be imparted to the first rubber section 31 and the second rubber section 32 because the first outer tube section 321 and the second outer tube section 322 are held and fixed by the tubular member 40 in a state where they are relatively moved in the axis O direction and the split surfaces thereof approach each other.

That is, even when the outer tube member 320 (the first outer tube section 321 and the second outer tube section 322) is of such a shape that drawing work (diameter reduction work) cannot be executed, preliminary compression in the axis O direction can be imparted to the first rubber section 31 and the second rubber section 32 to increase the spring constant in the axis O direction, and durability against the displacement in the axis O direction can be improved.

Next, an anti-vibration device 400 in a fourth embodiment will be described referring to FIG. 11 to FIG. 15. FIG. 11(a) is a top view of the anti-vibration device 400 in the fourth embodiment, and FIG. 11(b) is a cross-sectional view of the anti-vibration device 400 taken along the line XIb-XIb of FIG. 11(a). Also, the same parts with those of each embodiment described above will be marked with the same reference signs, and description thereof will be omitted.

As shown in FIG. 11, an inner tube member 410 is a member formed into a rotation symmetry shape having the symmetry axis (rotation center) of the axis O and includes a shaft section 411 of a tubular shape in which an insertion hole is penetratingly formed along the axis O and a bulge section 412 of a spherical shape which bulges outward in the radial direction from the outer peripheral surface of the shaft section 411, and they are integrally formed from a metal material. The bulge section 412 is disposed in the center in the axis O direction of the shaft section 411 (the center in the vertical direction in FIG. 11(b)), and the center of the recessed spherical surface in the bulge section 412 is positioned on the axis O of the shaft section 411.

An outer tube member 420 is split into a first outer tube section 421 and a second outer tube section 422 at the center part in the axis O direction. Here, the detailed configuration of the outer tube member 420 will be described referring to FIG. 12. Also, the first outer tube section 421 and the second tube section 422 are the same member (configuration) and only the names are different, therefore the first outer tube section 421 will be hereinafter described, and description on the second outer tube section 422 will be omitted.

Figures 12A, 12B:
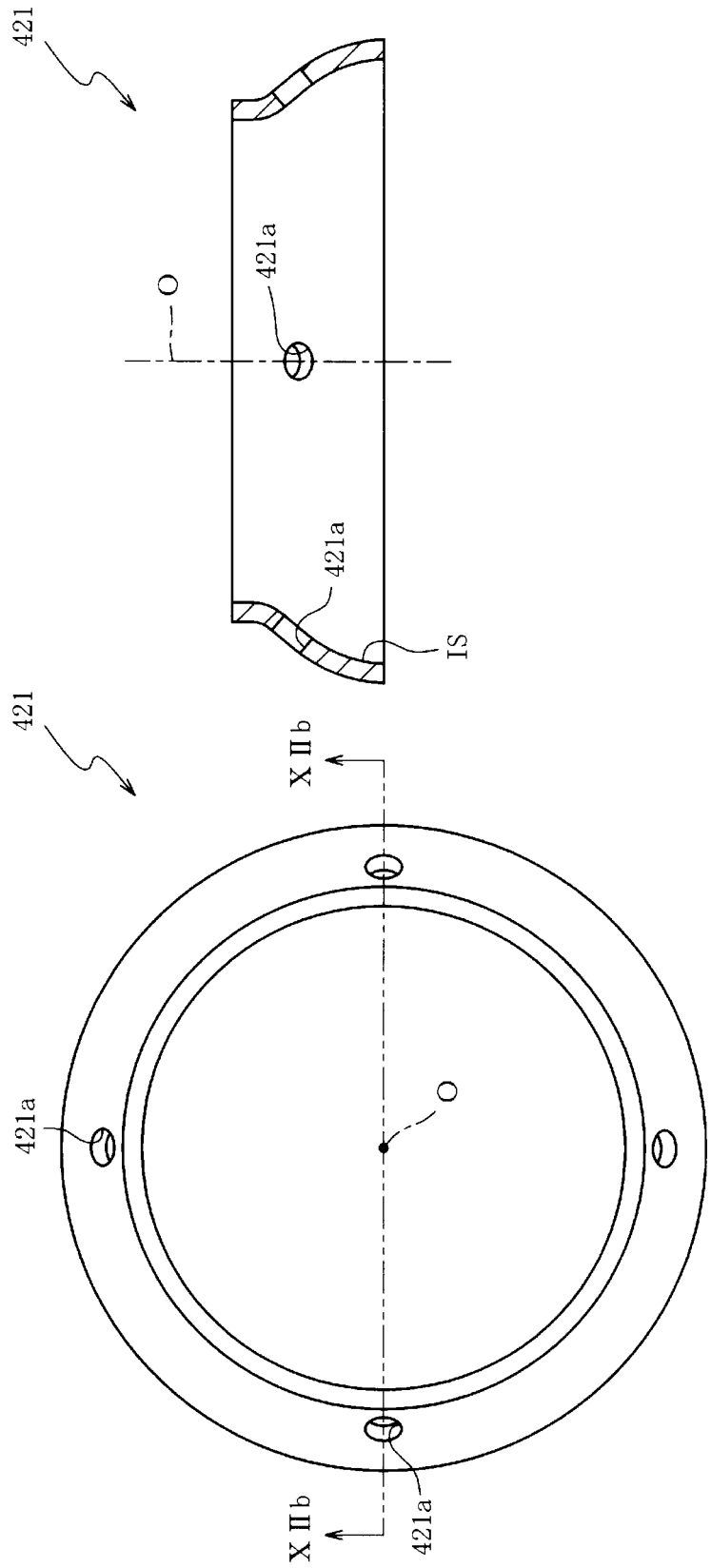
FIG. 12 (a) is a top view of the first outer tube section, and (b) is a cross-sectional view of the first outer tube section taken along the line XIIb-XIIb of FIG. 12(a).

FIG. 12(a) is a top view of the first outer tube section 421, and FIG. 12(b) is a cross-sectional view of the first outer tube section 421 taken along the line XIIb-XIIb of FIG. 12(a). Also, in FIG. 12, a state before executing drawing work (refer to FIG. 14) in the outer tube drawing step is illustrated.

As shown in FIG. 12, the first outer tube section 421 is a member obtained by forming a metal material (iron and steel material in the present embodiment) of a plate shape having a constant plate thickness into a container shape by pressing, and is formed into rotation symmetry having the symmetry axis (rotation center) of the axis O. Also, the fact that it is not necessary for the first outer tube section 421 to form the recessed grooves for enabling the drawing work as in the conventional device and the effect thereof are similar to those of the first outer tube section 21 in the first embodiment, and therefore description thereof will be omitted.

The first outer tube section 421 is formed of a portion of a cylindrical shape positioned on one end side in the axis O direction (the upper side in FIG. 12(b)) with the diameter (the inside diameter and the outside diameter) formed generally constant, and a portion connected to the portion of the cylindrical shape with the diameter generally expanded as it goes toward the split surface (the lower end surface in FIG. 12(b)) and with the cross-sectional shape curved in an arc shape.

With respect to the first outer tube section 421, in a state before executing the drawing work by the outer tube drawing step described below, the inside diameter dimension of the portion of the cylindrical shape (that is, the minimum inside diameter dimension at the axis O direction end opening (the upper side in FIG. 12(b)) of the first outer tube section 421) is made smaller than the maximum outside diameter dimension in the bulge section 412 of the inner tube member 410 (refer to FIG. 13(b)).

In the portion whose cross-sectional shape is curved in an arc shape, plural (four in the present embodiment) through holes 421a are penetratingly formed at an equal gap in the peripheral direction. Also, the inner peripheral surface of the portion curved in an arc shape becomes the recessed inner peripheral surface IS surrounding the bulge section 412 of the inner tube member 410. By being subjected to drawing work (deforming by drawing) in the outer tube drawing step (refer to FIG. 14), the recessed inner peripheral surface IS is made to resemble the shape of a spherical surface of a recessed shape which is concentric with the spherical surface of a projected shape of the bulge section 412 of the inner tube member 410.

Description will be made returning to FIG. 11. With the exception that formation of the chamfered surface 40a is omitted, a tubular member 440 has the configuration similar to that of the tubular member 40 in the first embodiment (refer to FIG. 4 and FIG. 15(a)), and therefore description thereof will be omitted. Also, in FIG. 11, the tubular member 440 after drawing work is executed by the tubular member drawing step (refer to FIG. 15) is illustrated.

Next, the manufacturing method of the anti-vibration device 400 will be described referring to FIG. 13 to FIG. 15. First, the manufacturing method of a vulcanized molded body D will be described referring to FIG. 13, and the configuration of a rubber base body 430 will be described as well. FIG. 13(a) is a side view of the vulcanized molded body D, and FIG. 13(b) is a cross-sectional view of the vulcanized molded body D taken along the line XIIIb-XIIIb of FIG. 13(a).

As shown in FIG. 13, similarly to the case of the first embodiment, the vulcanized molded body D is manufactured by installing the inner tube member 410 and the outer tube member 420 (the first outer tube section 421 and the second outer tube section 422) inside the vulcanizing mold, vulcanizingly molding the rubber base body 430 (a first rubber section 431 and a second rubber section 432), and connecting the outer peripheral surface of the inner tube member 410 and the inner peripheral surface of the outer tube member 420 (the first outer tube section 421 and the second outer tube section 422) to each other by the rubber base body 430.

In this case, the vulcanizing mold includes a core positioned at the center in the axis O direction (the vertical direction of FIG. 13(b)) of the inner tube member 410 with the shape after clamping becoming an annular shape. In clamping, the inner periphery front edge of the core opposes the outer peripheral surface (the crown) of the bulge section 412 at a predetermined gap, and the upper surface and the lower surface of the core support the split surfaces of the first outer tube section 421 and the second outer tube section 422. Also, the supporting parts (not shown) by the core of the split surfaces are disposed intermittently in the peripheral direction.

The first outer tube section 421 and the second outer tube section 422 are installed inside the vulcanizing mold in a state where the split surfaces thereof are made apart from each other in the axis O direction, and the rubber base body 430 is vulcanizingly molded into a state of being split into the first rubber section 431 and the second rubber section 432 in the axis O direction because the core is interposed. That is, in the vulcanized molded body D, between the split surface of the first rubber section 431 and the split surface of the second rubber section 432 (and between the split surface of the first outer tube section 421 and the split surface of the second outer tube section 422), a space SP of a shape corresponding to the core (the channel shape cross section in the present embodiment) is formed.

The first rubber section 431 is a portion that connects the outer peripheral surface of the bulge section 412 of the inner tube member 410 and the recessed inner peripheral surface IS in the first outer tube section 421 to each other, and the second rubber section 432 is a portion that connects the outer peripheral surface of the bulge section 412 of the inner tube member 410 and the recessed inner peripheral surface IS in the second outer tube section 422 to each other.

The rubber base body 430 includes rubber membrane sections 431a, 431b coveringly arranged on the outer peripheral surface of the first outer tube section 421. The rubber membrane sections 431a, 431b are two belt-like membranes continuing in the peripheral direction, the rubber membrane section 431a continues to the first rubber section 431 through the through hole 421a of the first outer tube 421, and the rubber membrane section 431b continues to the first rubber section 431 through the split surface of the first outer tube 421 respectively.

Also, in the present embodiment, it is not necessary to penetratingly form a through hole for making the rubber membrane section 431b continue to the first rubber section 431 in the first outer tube section 421 in addition to the through hole 421a because a configuration that the rubber membrane section 431b continues to the first rubber section 431 through the split surface of the first outer tube section 421 is employed. Therefore, the rigidity of the first outer tube section 421 can be secured correspondingly, and the durability thereof can be improved because formation of the through hole can be suppressed to the minimum.

Here, the covering range of the rubber membrane sections 431a, 431b is partial, and the rubber membrane sections 431a, 431b are not coveringly arranged (that is, the outer peripheral surface of the first outer tube section 421 is exposed) in the regions above (the upper side of FIG. 13(b)) the rubber membrane section 431a and between the rubber membrane sections 431a, 431b. Thus, in the outer tube drawing step (refer to FIG. 14), the outer peripheral surface of the first outer tube section 421 can be directly pressed by the drawing die (not shown) without intervention of the rubber membrane sections 431a, 431b, and the drawing work thereof can be executed highly precisely.

The rubber base body 430 includes rubber membrane sections 432a, 432b coveringly arranged on the outer peripheral surface of the second outer tube section 422. Description thereof will be omitted because these rubber membrane sections 432a, 432b are configured identically with the rubber membrane sections 431a, 431b respectively.

The assembling method for assembling the anti-vibration device 400 from the vulcanized molded body D and the tubular member 440 will be described referring to FIG. 14 and FIG. 15. In the first embodiment (the anti-vibration device 100), the rubber base body 30 (the first rubber section 31 and the second rubber section 32) is compressed in the axis O direction by the rubber base body compressing step (refer to FIG. 7). However, in the fourth embodiment (the anti-vibration device 400), such rubber base body compressing step is omitted.

Figures 14A, 14B:
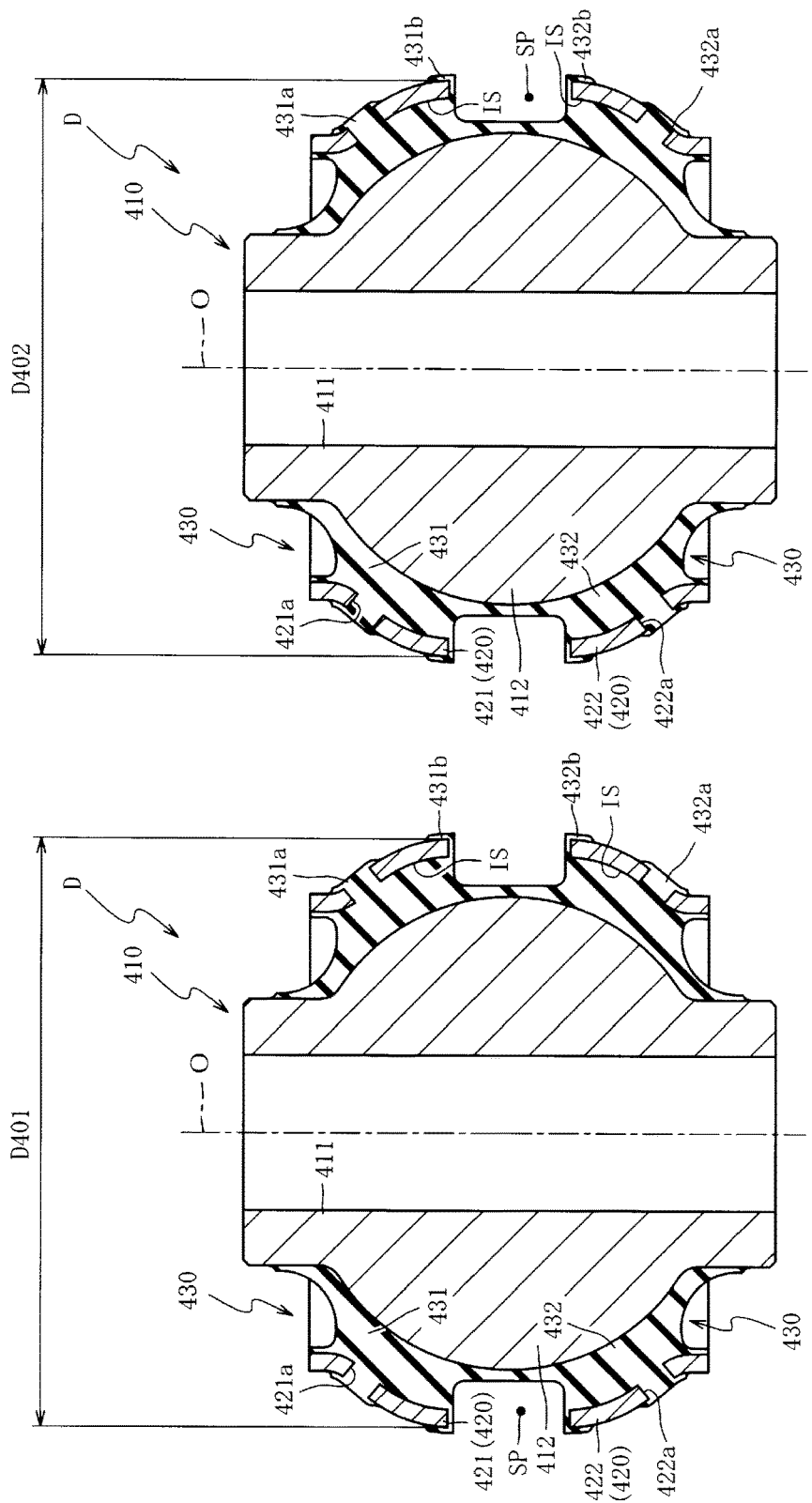
FIG. 14 (a) is a cross-sectional view of the vulcanized molded body in a state before drawing work is executed in the outer tube drawing step, and (b) is a cross-sectional view of the vulcanized molded body in a state after drawing work is executed in the outer tube drawing step.

FIG. 14(a) is a cross-sectional view of the vulcanized molded body D in a state before drawing work is executed in the outer tube drawing step, and FIG. 14(b) is a cross-sectional view of the vulcanized molded body D in a state after drawing work is executed in the outer tube drawing step.

As shown in FIG. 14, with respect to the vulcanized molded body D, in the outer tube drawing step, the diameter of the first outer tube section 421 and the second outer tube section 422 is reduced from the outside diameter D401 to the outside diameter D402 (D402<D401). Thus, preliminary compression in the radial direction (the direction perpendicular to the axis O) can be imparted to the rubber base body 430 (the first rubber section 431 and the second rubber section 432). Also, description thereof will be omitted because the configuration and the action of the drawing die are similar to those of the first embodiment.

Figures 15A, 15B:
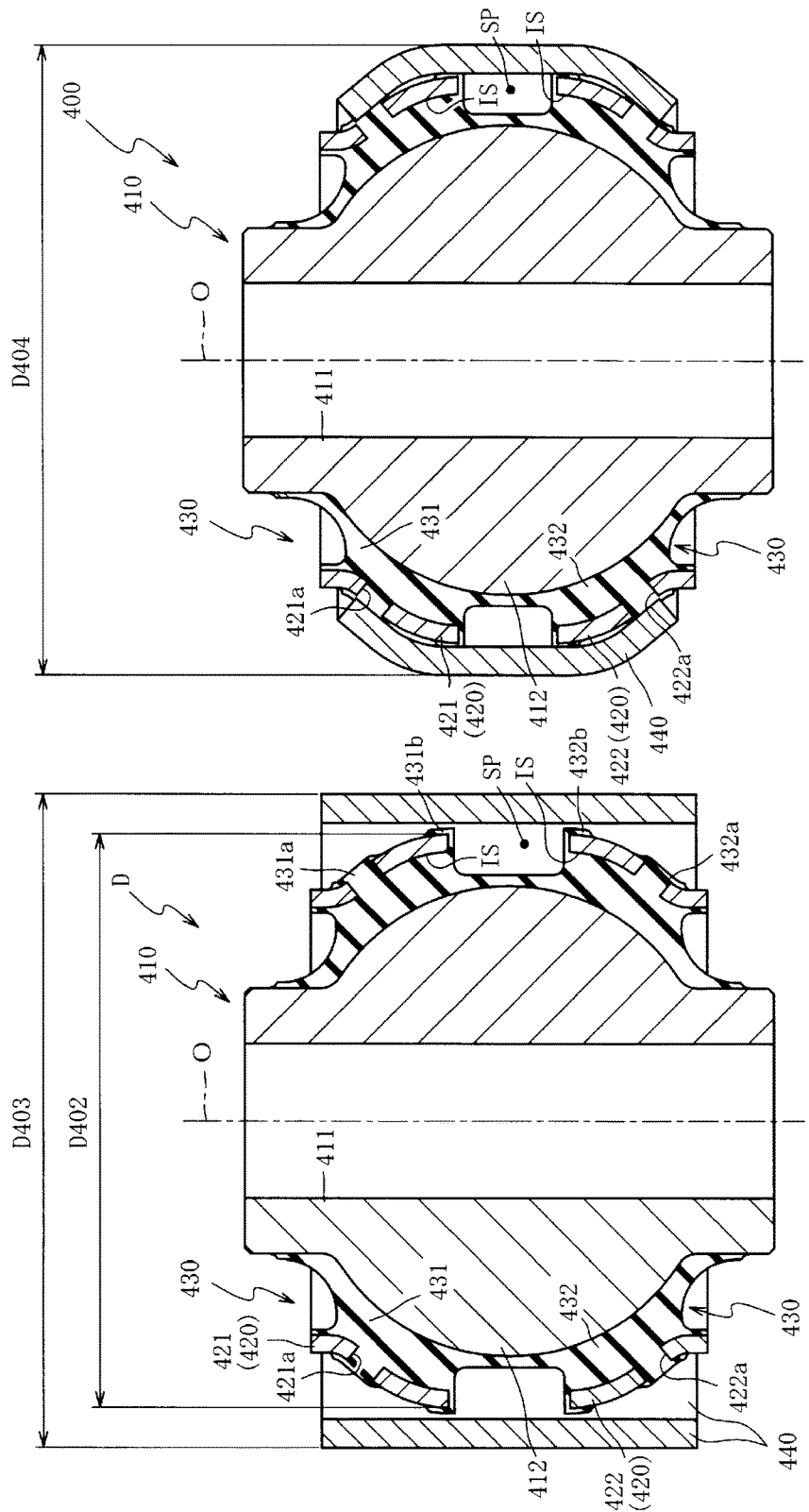
FIG. 15 (a) is a cross-sectional view of the vulcanized molded body and the tubular body in a state before the tubular member is subjected to drawing work in the tubular member drawing step, and (b) is a cross-sectional view of the anti-vibration device in a state after the tubular member is subjected to drawing work in the tubular member drawing step.

FIG. 15(a) is a cross-sectional view of the vulcanized molded body D and the tubular body 440 in a state before the tubular member 440 is subjected to drawing work in the tubular member drawing step, and FIG. 15(b) is a cross-sectional view of the anti-vibration device 400 in a state after the tubular member 440 is subjected to drawing work in the tubular member drawing step.

As shown in FIG. 15, in the fourth embodiment, because the rubber base body compressing step is omitted, after the vulcanized molded body D is inserted to the tubular member 440 along the axis O direction and the vulcanized molded body D is installed on the inner periphery side of the tubular member 440 (FIG. 15(a)), the tubular member 440 is subjected to drawing work in the tubular member drawing step (FIG. 15(b)).

In the tubular member drawing step, the tubular member 440 is subjected to drawing work in two stages. That is, by drawing work of the first stage, the diameter of the entire tubular member 440 is reduced from the outside diameter D403 to the outside diameter D404 (D404<D403). Next, by drawing work of the second stage, the tubular member 440 is diameter-reduced into such a shape that the portions on one end side in the axis O direction and on the other end side in the axis O direction excluding the center part in the axis O direction are tightly attached along the outer peripheral surface that becomes the back surface side of the recessed inner peripheral surface IS of the first outer tube section 421 and the second outer tube section 422 (that is, of the portion whose cross-sectional shape is bent in an arc shape) (is folded inward in the radial direction in the cross-sectional view). As a result, the tubular member 440 is mounted on the vulcanized molded body D, and assembling of them (manufacturing of the anti-vibration device 400) is completed.

Also, drawing work of the first stage and drawing work of the second stage may be executed by different drawing dies, or may be executed by the same drawing die. In executing the drawing work by the same drawing die, the drawing work of the first stage and the drawing work of the second stage may be executed simultaneously.

In the tubular member drawing step, the first outer tube section 421 and the second outer tube section 422 are pressed inward in the radial direction by the inner peripheral surface of the tubular member 440, and a predetermined tightening allowance (approximately 0.01 mm to 0.02 mm in terms of the radius in the present embodiment) is imparted to the first outer tube section 421 and the second outer tube section 422. Thus, the first outer tube section 421 and the second outer tube section 422 can be rigidly held inside the tubular member 440. In this case, the inner peripheral surface of the tubular member 440 and the rubber membrane sections 431a to 432b are tightly attached to each other by the elastic restoration force of the rubber membrane sections 431a to 432b compressed.

Also, as shown in FIG. 15(a), the inside diameter of the tubular member 440 is made larger than the outside diameter D402 of the outer tube member 420 (the first outer tube section 421 and the second outer tube section 422) after drawing work in the outer tube drawing step (refer to FIG. 14(b)) is executed. In the present embodiment, the inside diameter of the tubular member 440 is made larger than the maximum outside diameter of the vulcanized molded body D (the outside diameter at the outer peripheral surface of the rubber membrane sections 431b, 432b). Thus, in the assembling work for the anti-vibration device 400, work for inserting the vulcanized molded body D to the inner periphery side of the tubular member 440 along the axis O direction can be executed efficiently.

However, it is also allowable that the inside diameter of the tubular member 440 is made larger than the outside diameter D402 of the outer tube member 420 and smaller than the maximum outside diameter of the vulcanized molded body D (the diameter at the outer peripheral surface of the rubber membrane sections 431b, 432b) and is in a relation that the rubber membrane sections 431b, 432b are pressed in while being elastically deformed. By suppressing the working amount of the drawing work executed on the tubular member 440, the yield can be improved and the working cost can be reduced.

Also, similarly to the case of the first embodiment, the friction coefficient can be secured, and shortage of the tightening allowance by the spring back of the tubular member 440 can be compensated by the compressing force by elastic restoration of the rubber membrane sections 431a to 432b because the rubber membrane sections 431a to 432b are coveringly arranged on the outer peripheral surface of the first outer tube section 421 and the second outer tube section 422. Therefore, even when the split surface of the first outer tube section 421 and the split surface of the second outer tube section 422 are made apart from each other, the holding force against movement in the axis O direction can be secured. Thus, the first outer tube section 421 and the second outer tube section 422 can be prevented from moving inside the tubular member 440 toward the direction making the split surfaces thereof approach each other when a large displacement is inputted in the axis O direction.

As described above, according to the anti-vibration device 400, the rubber base body compressing step is omitted, and the first outer tube section 421 and the second outer tube section 422 are held and fixed by the tubular member 440 in a state where the split surface of the first rubber section 431 and the split surface of the second rubber section 432 are made apart from each other in the axis O direction and the space SP is formed between the split surfaces (that is, a state where preliminary compression in the axis O direction is not imparted to the first rubber section 431 and the second rubber section 432).

Thus, by the portion of the space SP, the compressing component of the first rubber section 431 and the second rubber section 432 in the axis O direction can be secured while suppressing the shearing component of the first rubber section 431 and the second rubber section 432 in the prying direction and the compressing component of the first rubber section 431 and the second rubber section 432 in the direction perpendicular to the axis O because the space SP is formed between the split surface of the first rubber section 431 and the split surface of the second rubber section 432. As a result, the spring constant in the axis O direction can be increased while reducing the spring constant in the prying direction and the spring constant in the direction perpendicular to the axis O.

In particular, according to the anti-vibration device 400, with respect to displacement in the axis O direction, the receiving area can be increased and the compressing component of the first rubber section 431 and the second rubber section 432 can be secured because the maximum outside diameter dimension (the outside diameter at the center part in the axis O direction) in the bulge section 412 of the inner tube member 410 is made larger than the minimum inside diameter dimension at the axis O direction end opening (the inside diameter of the portion of the cylindrical shape) of the first outer tube section 421 and the second outer tube section 422. As a result, the effect of increasing the spring constant in the axis O direction while reducing the spring constant in the prying direction and the spring constant in the direction perpendicular to the axis O can be made significant.

Also, such relation between the maximum outside diameter of the bulge section 412 and the minimum inside diameter of the outer tube member 420 cannot be employed in the conventional device in which the rubber base body is continuously disposed between the bulge section 412 of the inner tube member 410 and the recessed inner peripheral surface IS of the outer tube member 420 (that is, not having the space SP) because the shearing component of the rubber base body in the prying direction and the compressing component of the rubber base body in the direction perpendicular to the axis O are also increased simultaneously with the compressing component of the rubber base body in the axis O direction. The relation can be employed only after forming the space SP between the split surface of the first rubber section 431 and the split surface of the second rubber section 432 as in the anti-vibration device 400.

Here, in the present embodiment, the technical idea is to omit the rubber base body compressing step (refer to FIG. 7) and not to impart the preliminary compression in the axis O direction to the first rubber section 431 and the second rubber section 432 with respect to the first embodiment.

However, it is allowed that the first rubber section 431 and the second rubber section 432 are compressively deformed in the axis O direction with the deformation on one end side in the axis O direction and on the other end side in the axis O direction of the tubular member 440 in the tubular member drawing step (refer to FIG. 15). In other words, the concept is that the space SP only has to be secured between the split surface of the first rubber section 431 and the split surface of the second rubber section 432.

Figure 16:
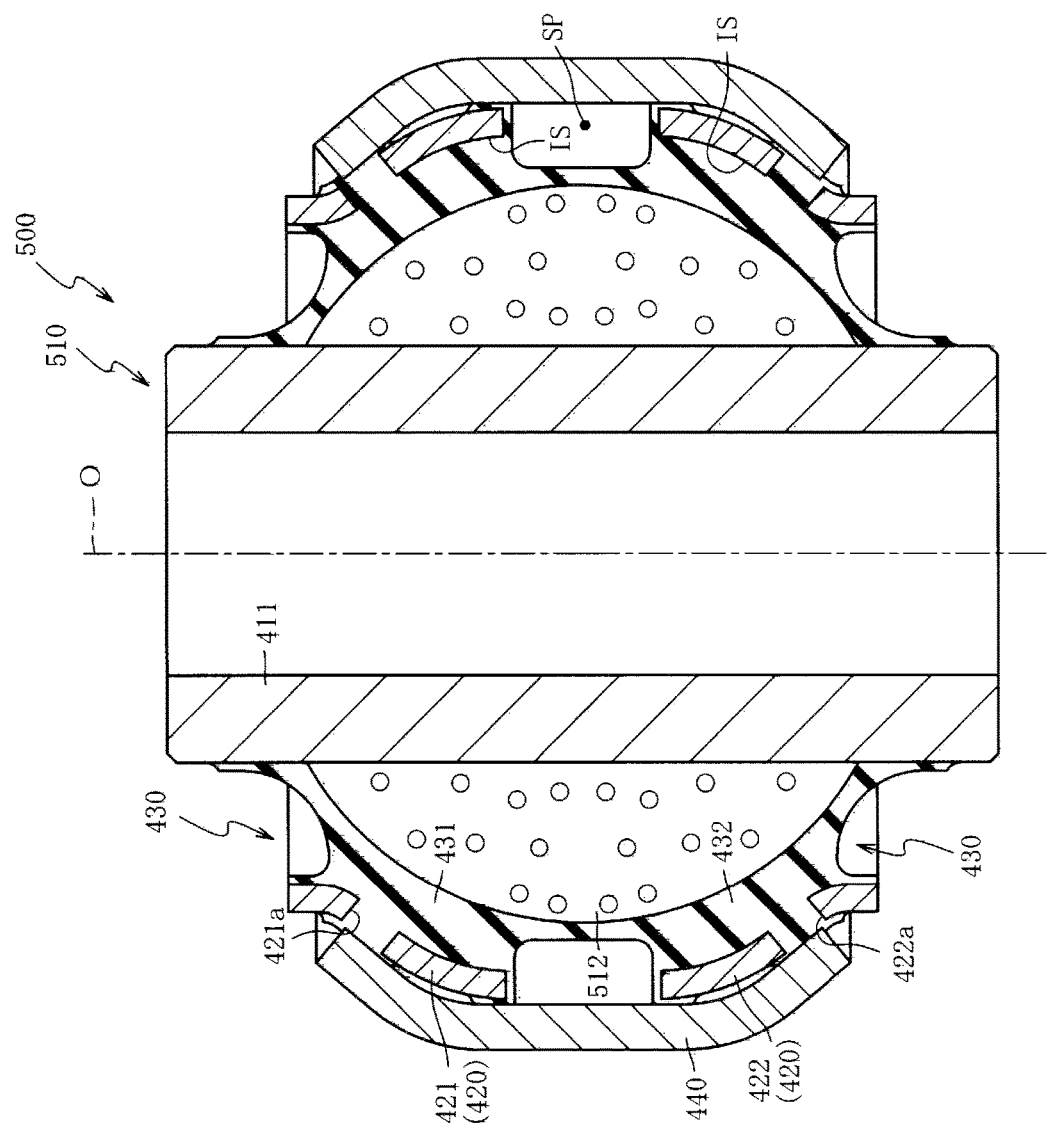
FIG. 16 is a cross-sectional view of the anti-vibration device in the fifth embodiment.

Next, an anti-vibration device 500 in a fifth embodiment will be described referring to FIG. 16. Also, the same parts with those of each embodiment described above will be marked with the same reference signs, and description thereof will be omitted. FIG. 16 is a cross-sectional view of the anti-vibration device 500 in the fifth embodiment.

With the exception that the configuration of an inner tube member 510 is different from the configuration of the inner tube member 410 in the fourth embodiment, the anti-vibration device 500 in the fifth embodiment is the same as the anti-vibration device 400 in the fourth embodiment with respect to the other configurations. Therefore, description of these same parts will be omitted.

As shown in FIG. 16, the inner tube member 510 of the anti-vibration device 500 in the fifth embodiment includes a shaft section 411 of a tubular shape and a bulge section 512 of a spherical shape that bulges outward in the radial direction from the shaft section 411, and the bulge section 512 is formed of a resin material. That is, the shaft section 411 and the bulge section 512 are formed separately from different materials. Even in the anti-vibration device 500 that employs the inner tube member 510 thus configured, the same action effect as that of the anti-vibration device 400 in the fourth embodiment can be exerted.

Next, an anti-vibration device 600 in a sixth embodiment will be described referring to FIG. 17 and FIG. 18. Although only the outer tube member 20 is split into two at the center part in the axis O direction in the first embodiment, in the sixth embodiment, in addition to an outer tube member 620, an inner tube member 610 is also split into two at the center part in the axis O direction. Further, the same parts with those of each embodiment described above will be marked with the same reference signs, and description thereof will be omitted.

Also, a first inner tube section 610a, a first outer tube section 621 and a first rubber section 631 are the same members (configurations) as a second inner tube section 610b, a second outer tube section 622 and a second rubber section 632, and only the names are different. Therefore only the former will be hereinafter described, and description on the latter will be omitted.

Figure 17:
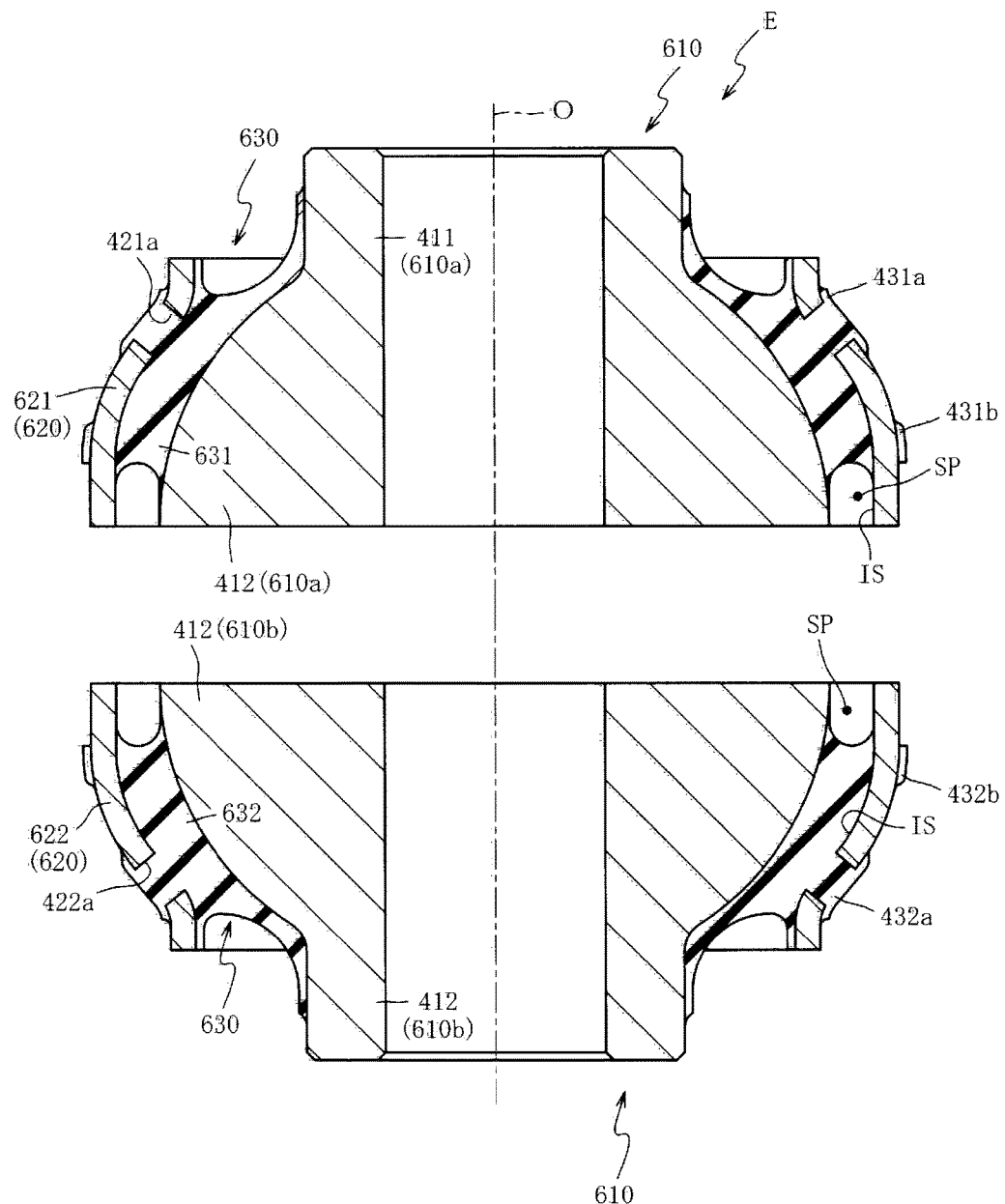
FIG. 17 is a cross-sectional view of the vulcanized molded body in the sixth embodiment.

FIG. 17 is a cross-sectional view of the vulcanized molded body E in the sixth embodiment. As shown in FIG. 17, the inner tube member 610 in the sixth embodiment is formed into such a shape that the inner tube member 410 in the fourth embodiment (refer to FIG. 13(b)) is split into the first inner tube section 610a and the second inner tube section 610b at the center part in the axis O direction. That is, the inner tube member 610 is formed into a shape identical to that of the inner tube member 410 that includes the shaft section 411 of a tubular shape and the bulge section 412 of a spherical shape that bulges outward in the radial direction from the shaft section 411 as a result of the split surfaces of the first inner tube section 610a and the second inner tube section 610b are abutting upon each other (refer to FIG. 18(a)).

The outer tube member 620 (the first outer tube section 621 and the second outer tube section 622) in the sixth embodiment is formed into such a shape that the split surface side of a portion whose cross-sectional shape is curved in an arc shape is extended in the axis O direction with respect to the outer tube member 420 (the first outer tube section 421 and the second outer tube section 422) in the fourth embodiment (refer to FIG. 13(b)).

That is, the first outer tube section 621 is formed of a portion of a cylindrical shape positioned on one end side in the axis O direction (the upper side of FIG. 17) with the diameter thereof formed generally constant, and a portion connected to the portion of a cylindrical shape with the cross-sectional shape thereof curved in an arc shape and with the diameter thereof gradually expanded as it goes toward the split surface (the lower end surface in FIG. 17).

The vulcanized molded body E is manufactured by vulcanizingly molding a first rubber section 631 inside a vulcanizing mold where the first inner tube section 610a and the first outer tube section 621 are installed, and connecting the outer peripheral surface in the bulge section 412 of the first inner tube section 610a and the recessed inner peripheral surface IS in the first outer tube section 621 with each other by the first rubber section 631. That is, in the vulcanized molded body E, the upper half and the lower half shown in FIG. 17 are made to have a shape (configuration) identical to each other.

In this case, the vulcanized molded body E is brought into a state where that the split surface of the first inner tube section 610a and the split surface of the first outer tube section 621 are disposed at the same position in the axis O direction (that is, a state where the split surfaces of the both are positioned within the same flat plane), and is formed into such a shape that the first rubber section 631 is positioned so as to retreat in the axis O direction from the split surface of the first inner tube section 610a and the split surface of the first outer tube section 621. Thus, in the first rubber section 631, the space SP to which the split surface side of the first inner tube section 610a and the first outer tube section 621 opens and which is a space continuing in the peripheral direction is formed between the outer peripheral surface in the bulge section 412 of the first inner tube section 610a and the recessed inner peripheral surface IS of the first outer tube section 621.

The assembling method for assembling the anti-vibration device 600 from the vulcanized molded body E and the tubular member 440 will be described referring to FIG. 18. Also, in the sixth embodiment (the anti-vibration device 600), the rubber base body compressing step is omitted as in the fourth embodiment (the anti-vibration device 400). The other steps are similar to those of the fourth embodiment.

FIG. 18(a) is a cross-sectional view of the vulcanized molded body E subjected to drawing work in the outer tube drawing step and the tubular member 440 in a state before being subjected to drawing work in the tubular member drawing step, and FIG. 18(b) is a cross-sectional view of the anti-vibration device 600 in a state after the tubular member 440 is subjected to drawing work in the tubular member drawing step.

As shown in FIG. 18(a), after the first outer tube section 621 and the second outer tube section 622 are subjected to drawing work and the outside diameter thereof is reduced in the outer tube drawing step, the vulcanized molded body E is inserted to the tubular member 440 along the axis O direction, and the process is shifted to the tubular member drawing step. In the tubular member drawing step, similarly to the case of the fourth embodiment, the tubular member 440 is subjected to drawing work in two stages. As a result, as shown in FIG. 18(b), the tubular member 440 is mounted on the vulcanized molded body E, and assembling of them (manufacturing of the anti-vibration device 600) is completed.

Also, in the outer tube drawing step and the tubular member drawing step, in a state where the split surface of the first inner tube section 610*a* and the split surface of the second inner tube section 610*b* are made to abut upon each other and the inner tube member 610 is clamped and held from both sides in the axis O direction by a jig not shown, the outer tube member 620 or the tubular member 440 is subjected to drawing work. In this case, the first outer tube section 621 and the second outer tube section 622 are also brought into a state where the split surfaces thereof are made to abut upon each other.

Figure 18:
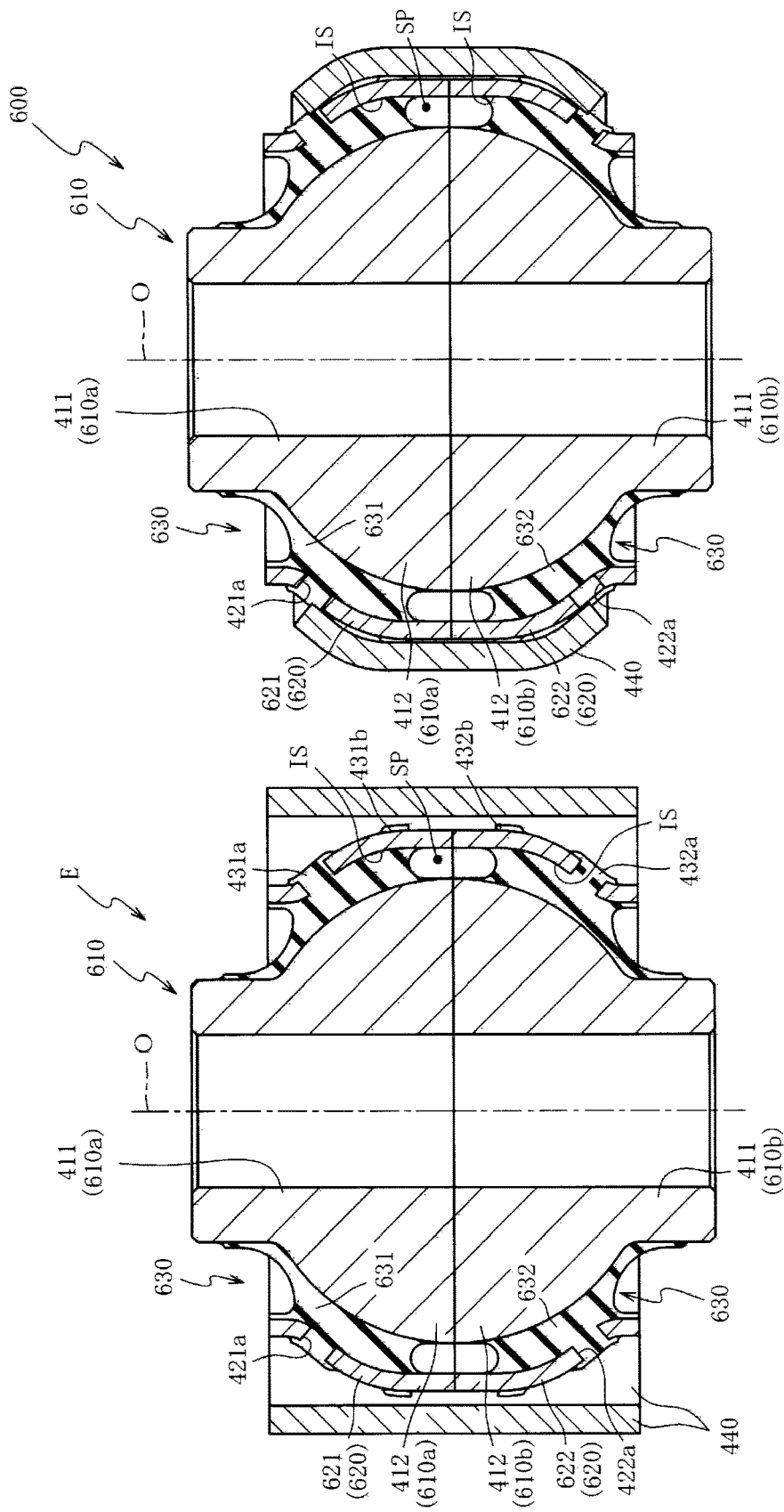
FIG. 18(a) is a cross-sectional view of the vulcanized molded body subjected to drawing work in the outer tube drawing step and the tubular member in a state before being subjected to drawing work in the tubular member drawing step, and (b) is a cross-sectional view of the anti-vibration device in a state after the tubular member is subjected to drawing work in the tubular member drawing step.

As described above, according to the anti-vibration device 600 in the sixth embodiment, as shown in FIG. 18(*b*), the first outer tube section 621 and the second outer tube section 622 can be held and fixed by the tubular member 440 in a state where the split surfaces of the first inner tube section 610*a* and the first outer tube section 621 and the split surfaces of the second inner tube section 610*b* and the second outer tube section 622 are made to abut upon each other. Therefore, the event that preliminary compression in the axis O direction is imparted to the first rubber section 631 and the second rubber section 632 can be avoided. Also, the space SP can be formed between the split surface of the first rubber section 631 and the split surface of the second rubber section 632, and, by the space SP, the spring constant in the axis O direction can be increased while reducing the spring constant in the prying direction and the spring constant in the direction perpendicular to the axis O.

Also, according to the anti-vibration device 600, these first outer tube section 621 and second outer tube section 622 can be restricted from moving toward the direction making the split surfaces thereof approach each other inside the tubular member 440 because the split surface of the first outer tube section 621 and the split surface of the second outer tube section 622 can be kept abutted upon each other while the space SP is set between the split surface of the first rubber section 631 and the split surface of the second rubber section 632 as described above.

Similarly, according to the anti-vibration device 600, the portions on one end side in the axis O direction and on the other end side in the axis O direction excluding the center part in the axis O direction of the tubular member 440 are diameter-reduced into a shape of being tightly attached along the outer peripheral surface that becomes the back surface side of the recessed inner peripheral surface IS of the first outer tube section 421 and the second outer tube section 422 (that is, of the portions whose cross-sectional shape is curved in an arc shape) (is folded inward in the radial direction in the cross-sectional view), and therefore the first outer tube section 621 and the second outer tube section 622 can be restricted also from moving to the direction making the split surfaces thereof apart from each other relatively to the tubular member 440.

That is, when the first outer tube section 621 and the second outer tube section 622 are to move toward the direction making the split surfaces thereof approach each other, the movement is restricted by abutment of the split surfaces upon each other, whereas in moving toward the direction making the split surfaces thereof apart from each other, the movement can be restricted by the portion on one end side in the axis O direction or on the other end side in the axis O direction of the tubular member 440. Thus, when a large displacement in the axis O direction is inputted, the position of the first outer tube section 621 and the second outer tube section 622 can be securely prevented from being shifted in the axis O direction relatively to the tubular member 440 because the movement toward these both directions can be restricted without relying on the friction against the inner peripheral surface of the tubular member 440.

Figure 19:
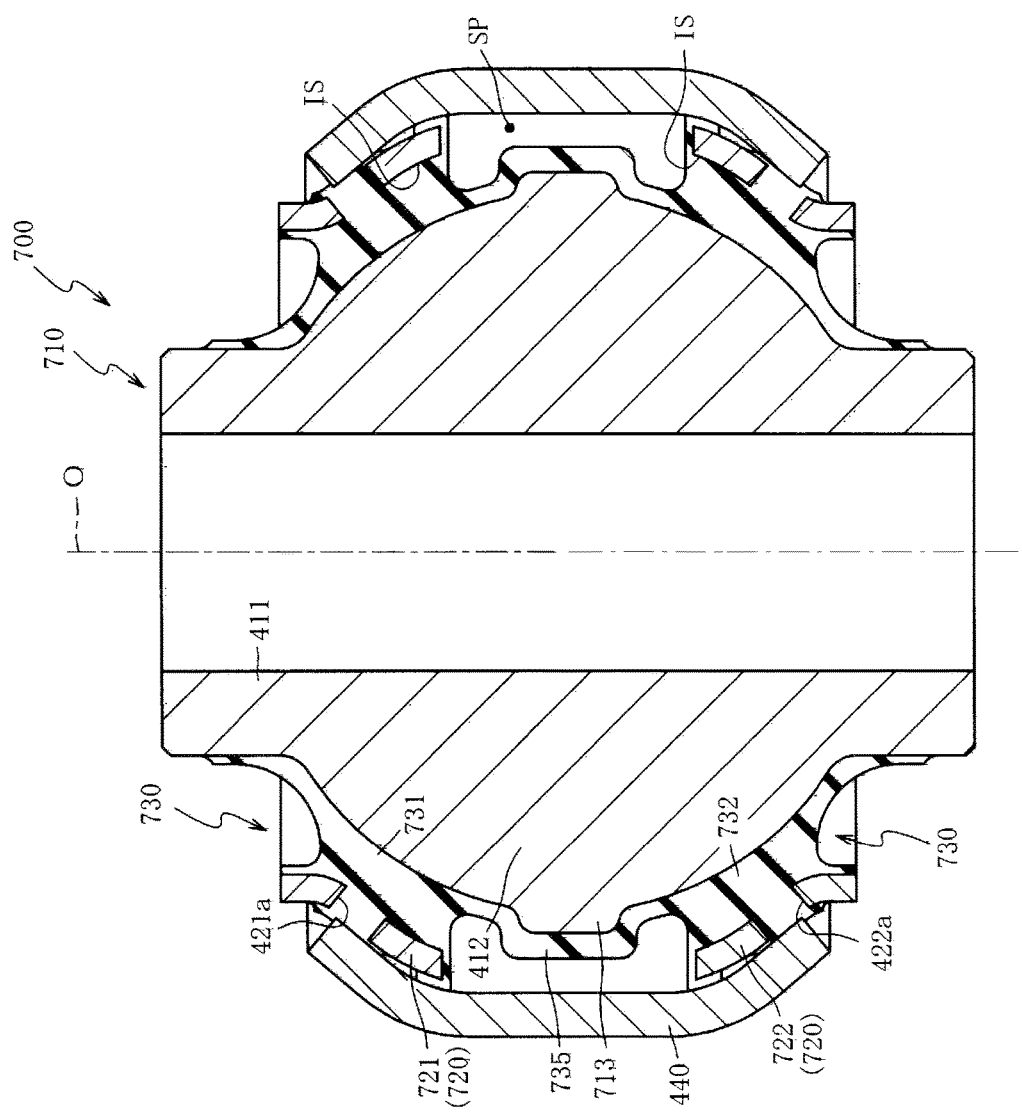
FIG. 19 is a cross-sectional view of the anti-vibration device in the seventh embodiment.

Next, an anti-vibration device 700 in a seventh embodiment will be described referring to FIG. 19. Also, the same parts with those of each embodiment described above will be marked with the same reference signs, and description thereof will be omitted. FIG. 19 is a cross-sectional view of the anti-vibration device 700 in the seventh embodiment.

As shown in FIG. 19, with respect to the anti-vibration device 700 in the seventh embodiment, in an inner tube member 710, a stopper projection section 713 is projected outward in the radial direction from the center part in the axis O direction of the bulge section 412. The stopper projection section 713 is formed so as to continue in the peripheral direction, and the projection front end surface thereof is formed as an outer peripheral surface of a cylinder having the center of the axis O (that is, the projection front end surface is formed into a linear shape parallel with the axis O in the cross-sectional view shown in FIG. 19).

With respect to the outer tube member 420 (the first outer tube section 421 and the second outer tube section 422) in the fourth embodiment (refer to FIG. 13(*b*)), an outer tube member 720 (a first outer tube section 721 and a second outer tube section 722) is formed into such a shape that the split surface side of the portion whose cross-sectional shape is curved in an arc shape is shortened in the axis O direction. Therefore, the dimension in the axis O direction of the space SP can be increased, as much as the shortening, with respect to the anti-vibration device 400 in the fourth embodiment. Also, the separation dimension along the axis O direction between the split surface of the first outer tube section 721 and the split surface of the second outer tube section 722 is set to a size through which a stopper rubber section 735 described below can pass.

A rubber base body 730 includes the stopper rubber section 735 coveringly arranged in the entire stopper projection section 713, and the stopper rubber section 735 continues to a first rubber section 731 and a second rubber section 732 which connect the recessed inner peripheral surface of the first outer tube section 721 and the second outer tube section 722 and the outer peripheral surface of the bulge section 412 of the inner tube member 710 to each other respectively. In the stopper rubber section 735, the thickness dimension (the dimension in the right-left direction in FIG. 19) is set so that a predetermined gap is formed in the radial direction between the outer peripheral surface thereof and the inner peripheral surface of the tubular member 440.

As described above, according to the anti-vibration device 700 in the seventh embodiment, when a large displacement in the radial direction (the direction perpendicular to the axis O) is inputted, the stopper function of making the stopper projection section 713 abut upon the inner peripheral surface of the tubular member 440 through the stopper rubber section 735 and restricting deformation of the rubber base body 730 accompanying the inputted displacement to a predetermined amount can be exerted. Thus, durability of the rubber base body 730 can be improved.

In particular, according to the anti-vibration device 700, because the portion (the stopper projection section 713 and the stopper rubber section 735) for exerting the stopper function can be stored inside the space SP formed between the split surface of the first rubber section 731 and the split surface of the second rubber section 732, the space SP that becomes a dead space is effectively utilized and the anti-vibration device 700 can be miniaturized while improving the durability of the rubber base body 730 by exertion of the stopper function.

The present invention has been described above based on the embodiments. However, it can be easily presumed that the present invention is not limited to the embodiments described above by any means, and a variety of improvements and alterations are possible within the scope not departing from the objects of the present invention.

The numerical figures cited in each embodiment described above are an example, and it is a matter of course that other numerical figures can be employed. For example, the dimensions of respective configurations (the outside diameter D1-D4, D401-D404, and the like), the value of the tightening allowance and the like can be set optionally.

The anti-vibration device may be configured by combining or replacing a part or whole of the anti-vibration device in each embodiment described above with a part or whole of the anti-vibration device in the other embodiments. For example, the bulge section 412 of the inner tube member 710 in the seventh embodiment may be replaced by the bulge section 512 of the inner tube member 510 in the fifth embodiment, and the stopper projection section 713 may be combined with the bulge section 512 made of a resin and may be formed integrally. The yield can be improved and the manufacturing cost can be reduced because machining and complicated forging for forming the stopper projection section 713 can be dispensed with.

In the first to the third embodiments described above, in the vulcanized molded bodies A to C, although the case is described where the first rubber section 31 and the second rubber section 32 are split (the split surfaces thereof are made apart from each other in the axis O direction), the present invention is not necessarily limited to it, and the split surface of the first rubber section 31 and the split surface of the second rubber section 32 may continue to each other at a part thereof (a part on the outer peripheral surface side of the bulge section 12 of the inner tube member 10). On the other hand, in the fourth and the fifth embodiments, although the case is described where the split surface of the first rubber section 431 and the split surface of the second rubber section 432 continue to each other at a part thereof, the present invention is not necessarily limited to it, and the first rubber section 431 and the second rubber section 432 may be split.

In the first to the third embodiments described above, the case is described where the split surface of the first outer tube section 21, 321 and the split surface of the second outer tube section 22, 322 are made apart from each other in the axis O direction in the completed state (the state of the anti-vibration device 100-300). However, the present invention is not necessarily limited to it, and the split surface of the first outer tube section 21, 321 and the split surface of the second outer tube section 22, 322 may be made to abut upon each other in the completed state.

That is, the anti-vibration device 100 to 300 may be manufactured so as to be in the above state by compressing the rubber base body 430 (the first rubber section 31 and the second rubber section 32) in the axis O direction to a position where the split surface of the first outer tube section 21, 321 and the split surface of the second outer tube section 22, 322 are made to abut upon each other in the rubber base body compressing step, subjecting, in this state, the tubular member 40 to drawing work in the tubular member drawing step, and subjecting the ends in the axis O direction of the tubular member 40 to bending work in the bending step.

On the other hand, in the first to the third embodiments, the rubber base body compressing step may be omitted. That is, after the outer tube drawing step, the process may be shifted to the tubular member drawing step without executing the rubber base body compressing step (without imparting preliminary compression in the axis O direction to the rubber base body 430).

In each of the embodiments described above, the case is described where the rubber membrane sections 33, 34, 233, 234, 431a, 431b are coveringly arranged on the outer peripheral surface of the outer tube members 20, 320, 420, 620, 720. However, the present invention is not necessarily limited to it, and, instead thereof or in addition thereto, the rubber membrane sections 33, 34, 233, 234, 431a, 431b may be coveringly arranged on the inner peripheral surface of the tubular members 40, 440.

In the first to the third embodiments described above, the case is described where the bending step was executed (the ends in the axis O direction of the tubular member 40 are subjected to bending work). However, the present invention is not necessarily limited to it, and the anti-vibration device 100 to 300 may be manufactured with the bending step omitted. That is, by the holding force between the tubular member 40 and the rubber membrane sections 33, 34, 333, 334 subjected to drawing work in the tubular member drawing step, the vulcanized molded bodies A to C may be held on the inner peripheral side of the tubular member 40.

Although the description is omitted in the first to the third embodiments described above, through holes may be formed in the first outer tube sections 21, 321 and the second outer tube sections 22, 322. The yield of the rubber membrane sections 33, 34, 333, 334 that continue to the first rubber section 31 and the second rubber section 32 can be improved because the fluidity of the rubber-like elastic body in the vulcanizing molding step can be secured by the through holes.

Although the description is omitted in the each embodiment described above, after the bending step, the inner tube members 10, 410, 510, 610, 710 may be subjected to diameter expansion work (work for expanding the area of the seat surface by compressing the inner tube member 10 in the axis O direction and expanding the diameter of the ends in the axis O direction).

In the first, second, and fourth to seventh embodiments, the case is described where the outer tube drawing step is executed (the outer tube members 20, 420, 620, 720 (the first outer tube sections 21, 421, 621, 721 and the second outer tube sections 22, 422, 622, 722) are subjected to drawing work). However, the present invention is not necessarily limited to it, and the anti-vibration devices 100, 200, 400 to 700 may be manufactured with the outer tube drawing step omitted.

In the third embodiment described above, the case is described where the outer tube member 320 was formed by casting. However, the present invention is not necessarily limited to it, and the outer tube member 320 may be formed by forging and machining, for example.

In the fourth to the seventh embodiments described above, the case is described where the rubber base body compressing step is omitted. However, the present invention is not necessarily limited to it, and the anti-vibration devices 400 to 700 may be manufactured in a state where preliminary compression in the axis O direction is imparted to the rubber base bodies 430, 630, 730 by the rubber base body compressing step.

In the seventh embodiment described above, the case is described where the stopper projection section 713 is formed so as to continue in the peripheral direction. However, the present invention is not necessarily limited to it, and the stopper projection section 713 may be formed intermittently in the peripheral direction.

Here, "the spherical surface of a recessed shape" described in the first aspect does not require a perfect spherical shape, and the concept is that the surface only has to be formed at least as a recessed surface disposed so as to oppose the spherical surface of a projected shape in the bulge section of the inner tube member. Similarly, "concentric with the spherical surface of a projected shape" also does not require that the centers perfectly agree to each other, and the concept is that the center of the spherical surface of a recessed shape only has to be positioned on the same side of the center of the spherical surface of a projected shape as viewed from the first outer tube section and the second outer tube section.

The invention claimed is:

1. An anti-vibration device comprising:

an inner tube member having a spherical bulge section that bulges outward in the radial direction at the center in the axial direction;

an outer tube member having a recessed inner peripheral surface that is formed into a spherical surface of a recessed shape which is concentric with a spherical surface of a projected shape in the bulge section of the inner tube member, surrounds the bulge section of the inner tube member and is disposed on the outer periphery side of the inner tube member;

a rubber base body that connects the outer peripheral surface of the bulge section of the inner tube member and the recessed inner peripheral surface of the outer tube member to each other and is formed of a rubber-like elastic body; and a tubular member formed into a tubular shape, disposed on the outer periphery side of the outer tube member, the tubular member holding and fixing the outer tube member, the tubular member is formed of a metal material having a constant plate thickness, the outer tube member is split into a first outer tube section and a second outer tube section in the axial direction, the rubber base body is split, in the axial direction into a first rubber section that connects the outer peripheral surface of the bulge section of the inner tube member and the recessed inner peripheral surface in the first outer tube section to each other and a second rubber section that connects the outer peripheral surface of the bulge section of the inner tube member and the recessed inner peripheral surface in the second outer tube section to each other, the first outer tube section and the second outer tube section are held and fixed by the tubular member in a state where the split surface of the first rubber section and the split surface of the second rubber section are apart from each other in the axial direction and a space is formed between the split surfaces of the first rubber section and the second rubber section, wherein provided on an outer peripheral surface of each of the first outer tube section and the second outer tube section is a first rubber membrane section and a second rubber membrane, each of the first rubber membrane sections and each of the second rubber membrane sections are a belt-like membrane continuing in the peripheral direction, the first rubber membrane of the first outer tube section covers one side of the split surface of the first outer tube section and the second rubber membrane of the first outer tube section covers an opposite side of the split surface of the first outer tube section adjacent the space formed between the split surfaces of the first rubber section and the second rubber section so that the second rubber membrane extends to an end of the split surface of the first outer tube section adjacent said space, the first rubber membranes covers a larger portion of the split surface than the second rubber membrane, the first rubber membrane of the second outer tube section covers one side of the split surface of the second outer tube section and the second rubber membrane of the second outer tube section covers an opposite side of the split surface of the second outer tube section adjacent the space formed between the split surfaces of the first rubber section and the second rubber section so that the second rubber membrane extends to an end of the split surface of the second outer tube section adjacent said space, the first rubber membranes covers a larger portion of the split surface than the second rubber membrane, a portion of the outer peripheral surface of the first outer tube section and a portion of the outer peripheral surface of the second outer tube section is exposed in a region located at least between the first rubber membrane section and the second section rubber membrane section thereof in a circumferential direction, and the first outer tube section and the second outer tube section have an arc shape having a constant thickness, a diameter of the tubular member is reduced in the axial direction so that one end side of an inner circumferential surface of the tubular member in the axis direction and the opposite end side of an inner circumferential surface of the tubular member in the axis direction are attached along an outer peripheral surface of the first outer tube section and the second outer tube section, the tubular member is diameter-reduced to form a shape wherein one end side in the axis direction and the opposite end side in the axis direction curve inward in a radial direction in a cross-sectional view, and a central portion of the tubular member in the axial direction is formed in a linear shape along the axial direction, an inner circumferential surface of the tubular member on one end side in the axial direction is in contact with the first rubber membrane of the first outer tube section, and an inner circumferential surface of the tubular member on another end side in the axial direction is in contact with the first rubber membrane of the second outer tube section, and the inner circumferential surface of the tubular member at the linear central portion is in contact with the second rubber membrane of the first outer tube section and the second rubber membrane of the second outer tube section, the first outer tube section and the second outer tube section are held in a state pressed inward in the radial direction by the inner peripheral surface of the tubular member, and a through hole is formed in each of the first outer tube section and the second outer tube section, the first rubber membrane of the first outer tube section continues to the first rubber section through the through hole of the first outer tube section, and the second rubber membrane of the first outer tube section continues to the first rubber section through the split surface of the first outer tube section, and the first rubber membrane of the second outer tube section continues to the second rubber section through the through hole of the second outer tube section, and the second rubber membrane of the second outer tube section continues to the second rubber section through the split surface of the second outer tube section.

2. The anti-vibration device according to claim 1, wherein the maximum outside diameter dimension in the bulge section of the inner tube member is larger than the minimum inside diameter dimension in an opening in the end in the axial direction of the first outer tube section and the second outer tube section.

3. The anti-vibration device according to claim 1, wherein the first outer tube section, and the second outer tube section are formed of a metal material.

4. The anti-vibration device according to claim 1, comprising:
 a stopper projection section projected outward in the radial direction from the center part of the bulge section in the axial direction; and
 a stopper rubber section coveringly arranged at the stopper projection section, formed of a rubber-like elastic body, and continuing to at least either of the first rubber section or the second rubber section;
 wherein the split surface of the first outer tube section and the split surface of the second outer tube section are made apart from each other in the axial direction;
 the outer peripheral surface of the stopper rubber section and the inner peripheral surface of the tubular member are made apart from each other in the radial direction; and
 the outer peripheral surface of the stopper rubber section is made capable of abutting upon the inner peripheral surface of the tubular member through a gap between the split surfaces of the first outer tube section and the second outer tube section.

5. The anti-vibration device according to claim 1, wherein the inner tube section is split into a first inner tube section and a second inner tube section at the center part in the axial direction of the bulge section;
 the outer peripheral surface of the bulge section in the first inner tube section and the recessed inner peripheral surface in the first outer tube section are connected to each other by the first rubber section and the first rubber section is positioned so as to retract in the axial direction from the split surface of the first outer tube section and the split surface of the first inner tube section in a state where the split surface of the first inner tube section and the split surface of the first outer tube section are disposed at the same position in the axial direction;
 the outer peripheral surface of the bulge section in the second inner tube section and the recessed inner peripheral surface in the second outer tube section are connected to each other by the second rubber section and the second rubber section is positioned so as to retract in the axial direction from the split surface of the second outer tube section and the split surface of the second inner tube section in a state where the split surface of the second inner tube section and the split surface of the second outer tube section are disposed at the same position in the axial direction; and
 the first outer tube section and the second outer tube section are held and fixed by the tubular member in a state where the split surfaces of the first inner tube section and the first outer tube section and the split surfaces of the second inner tube section and the second outer tube section are made to abut upon each other.

* * * * *